(12) United States Patent
Du

(10) Patent No.: US 12,212,583 B2
(45) Date of Patent: Jan. 28, 2025

(54) IOT SECURITY EVENT CORRELATION

(71) Applicant: Palo Alto Networks, Inc., Santa Clara, CA (US)

(72) Inventor: Jun Du, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 386 days.

(21) Appl. No.: 17/491,151

(22) Filed: Sep. 30, 2021

(65) Prior Publication Data

US 2023/0095870 A1    Mar. 30, 2023

(51) Int. Cl.
    H04L 9/40    (2022.01)

(52) U.S. Cl.
    CPC ...... H04L 63/1416 (2013.01); H04L 63/1425 (2013.01); H04L 63/1441 (2013.01)

(58) Field of Classification Search
    CPC ............. H04L 63/1416; H04L 63/1425; H04L 63/1441
    See application file for complete search history.

(56) References Cited

U.S. PATENT DOCUMENTS

| | | |
|---|---|---|
| 5,826,013 A | 10/1998 | Nachenberg |
| 5,987,610 A | 11/1999 | Franczek |
| 6,269,447 B1 | 7/2001 | Maloney |
| 6,775,780 B1 | 8/2004 | Muttik |
| 6,981,279 B1 | 12/2005 | Arnold |
| 7,904,959 B2 | 3/2011 | Sidiroglou |
| 8,156,541 B1 | 4/2012 | Thomas |
| 8,225,407 B1 * | 7/2012 | Thrower ............. H04L 63/1441 726/25 |
| 8,239,948 B1 | 8/2012 | Griffin |
| 8,424,091 B1 | 4/2013 | Su |
| 8,578,497 B2 | 11/2013 | Antonakakis |
| 8,695,095 B2 | 4/2014 | Baliga |
| 8,763,127 B2 | 6/2014 | Yao |
| 8,793,787 B2 | 7/2014 | Ismael |
| 8,806,639 B2 | 8/2014 | Mohler |
| 9,071,638 B1 | 6/2015 | Aziz |

(Continued)

FOREIGN PATENT DOCUMENTS

| | | |
|---|---|---|
| CN | 103842965 | 9/2017 |
| CN | 107526965 | 12/2017 |

(Continued)

OTHER PUBLICATIONS

Andriatsimandefitra et al., "Detection and Identification of Android Malware Based on Information Flow Monitoring," 2015 IEEE 2nd International Conference on Cyber Security and Cloud Computing, New York, NY, pp. 200-203, 2015.

(Continued)

*Primary Examiner* — Lesa M Kennedy
(74) *Attorney, Agent, or Firm* — Van Pelt, Yi & James LLP

(57) ABSTRACT

Correlating Internet of Things (IoT) security events is disclosed. A set of security events is received. A graph is generated, where nodes of the graph correspond to at least some of the received security events in the set. The edges in the graph correspond to identifiable patterns of correlation. A determination of whether or not the generated graph matches a prebuilt scenario is determined and a remedial action is taken in response to the determination.

23 Claims, 20 Drawing Sheets

(56) References Cited

U.S. PATENT DOCUMENTS

| | | | |
|---|---|---|---|
| 9,088,606 B2 | 7/2015 | Ranum | |
| 9,165,142 B1 | 10/2015 | Sanders | |
| 9,241,010 B1 | 1/2016 | Bennett | |
| 9,565,202 B1 | 2/2017 | Kindlund | |
| 9,596,253 B2 | 3/2017 | Chauhan | |
| 9,696,346 B2 | 7/2017 | Pietrowicz | |
| 10,862,909 B2 | 12/2020 | Moore | |
| 10,951,461 B2 | 3/2021 | Ganu | |
| 2003/0135791 A1 | 7/2003 | Natvig | |
| 2003/0200464 A1 | 10/2003 | Kidron | |
| 2004/0064731 A1 | 4/2004 | Nguyen | |
| 2005/0044422 A1 | 2/2005 | Cantrell | |
| 2005/0182950 A1 | 8/2005 | Son | |
| 2005/0216770 A1 | 9/2005 | Rowett | |
| 2006/0227758 A1 | 10/2006 | Rana | |
| 2007/0016953 A1 | 1/2007 | Morris | |
| 2007/0056038 A1 | 3/2007 | Lok | |
| 2007/0118350 A1 | 5/2007 | van der Made | |
| 2007/0121615 A1 | 5/2007 | Weill | |
| 2007/0192866 A1 | 8/2007 | Sagoo | |
| 2007/0289010 A1 | 12/2007 | Thomas | |
| 2008/0005782 A1 | 1/2008 | Aziz | |
| 2008/0016570 A1 | 1/2008 | Capalik | |
| 2008/0196104 A1 | 8/2008 | Tuvell | |
| 2008/0209557 A1 | 8/2008 | Herley | |
| 2008/0250128 A1 | 10/2008 | Sargent | |
| 2008/0307493 A1 | 12/2008 | Moghe | |
| 2009/0013405 A1 | 1/2009 | Schipka | |
| 2009/0064337 A1 | 3/2009 | Chien | |
| 2009/0094697 A1 | 4/2009 | Provos | |
| 2009/0126016 A1 | 5/2009 | Sobko | |
| 2009/0144827 A1 | 6/2009 | Peinado | |
| 2009/0238071 A1 | 9/2009 | Ray | |
| 2009/0282483 A1 | 11/2009 | Bennett | |
| 2010/0077476 A1 | 3/2010 | Adams | |
| 2010/0077481 A1 | 3/2010 | Polyakov | |
| 2010/0115620 A1 | 5/2010 | Alme | |
| 2010/0115621 A1 | 5/2010 | Staniford | |
| 2010/0146615 A1 | 6/2010 | Locasto | |
| 2010/0180344 A1 | 7/2010 | Malyshev | |
| 2010/0212010 A1 | 8/2010 | Stringer | |
| 2010/0217801 A1 | 8/2010 | Leighton | |
| 2010/0235879 A1* | 9/2010 | Burnside | H04L 63/0263 |
| | | | 709/224 |
| 2011/0041179 A1 | 2/2011 | Mika | |
| 2011/0071179 A1 | 3/2011 | Jahangir | |
| 2011/0078794 A1 | 3/2011 | Manni | |
| 2011/0099633 A1 | 4/2011 | Aziz | |
| 2011/0173698 A1 | 7/2011 | Polyakov | |
| 2011/0219448 A1 | 9/2011 | Sreedharan | |
| 2011/0252474 A1 | 10/2011 | Ward | |
| 2011/0276699 A1 | 11/2011 | Pedersen | |
| 2011/0321160 A1 | 12/2011 | Mohandas | |
| 2012/0054866 A1 | 3/2012 | Evans | |
| 2012/0222121 A1 | 8/2012 | Staniford | |
| 2012/0233691 A1 | 9/2012 | Jiang | |
| 2012/0233694 A1 | 9/2012 | Baliga | |
| 2012/0255021 A1 | 10/2012 | Sallam | |
| 2012/0272316 A1 | 10/2012 | Clevy | |
| 2012/0304244 A1 | 11/2012 | Huagang | |
| 2012/0331544 A1 | 12/2012 | Bostrom | |
| 2013/0086684 A1 | 4/2013 | Mohler | |
| 2013/0091570 A1 | 4/2013 | McCorkendale | |
| 2013/0104230 A1 | 4/2013 | Tang | |
| 2013/0152200 A1 | 6/2013 | Alme | |
| 2013/0239214 A1 | 9/2013 | Klein | |
| 2013/0298244 A1 | 11/2013 | Kumar | |
| 2013/0326625 A1 | 12/2013 | Anderson | |
| 2014/0269276 A1 | 9/2014 | Rothstein | |
| 2014/0280802 A1 | 9/2014 | McDowall | |
| 2015/0326594 A1 | 11/2015 | Chari | |
| 2015/0381637 A1 | 12/2015 | Raff | |
| 2016/0048683 A1 | 2/2016 | Sanders | |
| 2016/0088000 A1 | 3/2016 | Siva Kumar | |
| 2016/0147995 A1 | 5/2016 | Sallam | |
| 2016/0253232 A1* | 9/2016 | Puri | H04L 63/1425 |
| | | | 714/37 |
| 2016/0294851 A1 | 10/2016 | Langton | |
| 2017/0063566 A1 | 3/2017 | Seminario | |
| 2017/0155562 A1 | 6/2017 | Vasant | |
| 2017/0201529 A1 | 7/2017 | Hager | |
| 2017/0244737 A1 | 8/2017 | Kuperman | |
| 2017/0353302 A1 | 12/2017 | Fernandez | |
| 2017/0359306 A1 | 12/2017 | Thomas | |
| 2017/0371856 A1* | 12/2017 | Can | G06V 30/19173 |
| 2018/0091528 A1 | 3/2018 | Shahbaz | |
| 2018/0307833 A1 | 10/2018 | Noeth | |
| 2018/0365289 A1* | 12/2018 | Brown | G06F 16/24535 |
| 2019/0349426 A1 | 11/2019 | Smith | |
| 2020/0252265 A1 | 8/2020 | Ganu | |
| 2021/0352099 A1* | 11/2021 | Rogers | G06N 20/00 |
| 2023/0087309 A1* | 3/2023 | Pietila | H04L 63/1425 |
| | | | 726/23 |

FOREIGN PATENT DOCUMENTS

| | | | | |
|---|---|---|---|---|
| CN | 105787370 | 8/2018 | | |
| CN | 106453320 | 6/2019 | | |
| CN | 106022113 | 8/2019 | | |
| EP | 3079094 | 3/2020 | | |
| JP | 2007011628 | 1/2007 | | |
| JP | 2008176753 | 7/2008 | | |
| JP | 2009037545 | 2/2009 | | |
| WO | 2012162102 | 11/2012 | | |
| WO | WO-2013098830 A1 * | 7/2013 | | G06F 16/958 |
| WO | 2017217301 | 12/2017 | | |
| WO | 2020230265 | 11/2020 | | |

OTHER PUBLICATIONS

Author Unknown, "IoC Finder", Mandiant—Detect. Respond. Contain., Oct. 31, 2011.

Cesare et al., "Malwise—An Effective and Efficient Classification System for Packed and Polymorphic Malware", IEEE Transactions on Computers, 2012.

Hosmer et al., "Polymorphic and Metamorphic Malware", Black Hat Briefings and Training, 2008, WetStone Technologies.

Jang et al., "Andro-profiler: anti-malware system based on behavior profiling of mobile malware", In Proceedings of the 23rd International Conference on World Wide Web (WWW '14 Companion). ACM, New York, NY, USA, 737-738. 2014.

Jang et al., "Detecting and classifying method based on similarity matching of Android malware behavior with profile", SpringerPlus, 2016.

Nobutaka Kawaguchi, et al., A Study on User Support System for Combatingagainst Malware, Mar. 2, 2010, p. 83, Proceedings of The 2010 IEICE(Institute of Electronics, Information and Communication Engineers) General Conference, Communication 2.

* cited by examiner

```
{
    "evtType": "evt_connect",
    "iotDevid": "AA:BB:CC:01:02:03",
    "profileType": "unknown",
    "tenantid": "customerbeta1",
    "timestamp": 1591646393584,
    "evtContent": {
        "hostname": "IMAGING001",
        "hostname_src": "DHCP",
        "roles": " ",
        "monitored": true,
        "ip": "10.14.176.208",
        "ip_src": "dhcp",
        "dhcp_option_55": "1,3,28,6,15,12"
    },
    "@timestamp": "2020-06-08T20:08:55.944Z",
    "routerid": "44454C4C480010348046B2C04F4A5633",
    "profileId": "n/a",
    "profileCategory": "n/a",
    "profileVertical": "n/a",
}
```

FIG. 2D

```
{
  "sessionCount": "2",
  "evtType": "evt_session",
  "evtContent": {
    "sessions": [
      {
        "remoteURL": "10.226.138.12",
        "remoteIPAddr": "10.226.138.12",
        "remotePort": 9997,
        "ipProtocol": 6,
        "localIPAddr": "10.98.1.139",
        "localPort": 59970,
        "appName": "splunk",
        "txBytes": 59442,
        "rxBytes": 2383,
        "txPkts": 74,
        "rxPkts": 37,
        "tcpFlags": "SAPECF",
        "durationUsec": 30588831,
        "ts": "1591646859236",
        "profileType": "IoT",
        "profileConfidenceScore": 99,
        "profileId": "CT Scanner CT750HD",
        "profileVertical": "Medical",
        "profileCategory": "CT Scanner",
        "geoLocation": "Internal"
      },
      {
        "remoteURL": "www.google.com",
        "remoteIPAddr": "216.58.194.164",
        "remotePort": 443,
        "ipProtocol": 6,
        "localIPAddr": "10.98.1.139",
        "localPort": 59969,
        "appName": "web-browsing",
        "txBytes": 384,
        "rxBytes": 186,
        "txPkts": 6,
        "rxPkts": 3,
        "tcpFlags": "SAECF",
        "durationUsec": 559685,
        "ts": "1591646859244",
        "profileType": "IoT",
        "profileConfidenceLevel": 99,
        "profileId": "CT Scanner CT750HD",
        "profileVertical": "Medical",
        "profileCategory": "CT Scanner",
        "geoLocation": "Internal"
      }
    ]
  },
  "iotDevId": "XX:YY:ZZ:01:02:03",
  "@timestamp": "2020-06-08T20:10:31.728Z",
  "routerId": "4C4C454400383810804 2B8C04F363133",
  "tenantId": "customerbeta1",
  "timestamp": "1591647028789"
}
```

FIG. 2E

Code = Access-Request (1)
ID = x
Length = xx
Request Authenticator
    Attributes:
        Calling-Station-Id = "00:12:67:11:22:33"
        Framed-IP-Address = "10.10.10.1"
        NAS-IP-Address = <zingbox sensor IP>

FIG. 4A

Code = Access-Request (1)
ID = x
Length = xx
Request Authenticator
    Attributes:
        Calling-Station-Id = "00:12:67:11:22:33"
        Framed-IP-Address = "10.10.10.1"
        NAS-IP-Address = <zingbox sensor IP>
        Device-Profile = "Panasonic Panboard"
        Device-Category = "Interactive Whiteboard"
        Device-Type = "Office"
        Device-Vendor = "Panasonic Corporation"

FIG. 4B

Code = Access-Request (1)
ID = x
Length = xx
Request Authenticator
    Attributes:
        Calling-Station-Id = "00:12:67:11:22:33"
        Framed-IP-Adderss = "10.10.10.1"
        NAS-IP-Address = <zingbox sensor IP>
        Device-Profile = "Panasonic Panboard"
        Device-Category = "Interactive Whiteboard"
        Device-Type = "Office"
        Device-Vendor = "Panasonic Corporation"
        Device-Model = "KX-B430"
        Device-OS-Group = "Linux"
        Device-OS-Ver = "3.16"

FIG. 4C

```
1100 ──┐
         "detector-graph" : "wannacry-event-correlation",  ──── 1102
         "required_events" : {                                              ⎫
             {"event" : {"is" : ["internal_alert", "anomalies"]}},          ⎬ 1104
             {"event_type" : {"is" : "evt_threat"}}                         ⎭
         },
         "correlation" : {                                                  ⎫
             "scope" : "device",                                            ⎪
             "period" : "1 day",                                            ⎪
             "filter" : [                                                   ⎪
                 "dark-ip-scan",                                            ⎪
                 "excessive-outbound-connections-internet-anomaly",         ⎪
                 "ip-scan",                                                 ⎬ 1106
                 "excessive-anonymous-login-outbound-high-anomaly",         ⎪
                 "outbound-smb-anomaly",                                    ⎪
                 "eternal-blue-code-exploit",                               ⎪
                 "WannaCry-code-drop",                                      ⎪
                 "double-pulsar-exploit",                                   ⎪
                 "WannaCry-C2connection"                                    ⎪
             ]                                                              ⎭
         },
         "activation_condition" : [                                         ⎫
             "anomaly-level" : {"is" : 3.0},                                ⎬ 1108
             "sequence" : {"scan", "anomaly", "exploit", "code-drop",       ⎪
                          "C2connection", "anomaly"}                       ⎭
         ],
         "action" : {                                                       ⎫
             "type" : "publish_alerts",                                     ⎬ 1110
             "rate-limit" : none                                            ⎭
         }
```

FIG. 11

IOT SECURITY EVENT CORRELATION

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer and can perform additional nefarious tasks (e.g., exfiltrating sensitive data, propagating to other systems, etc.). A variety of approaches can be used to harden computers against such and other compromises. Unfortunately, existing approaches to protecting computers are not necessarily suitable in all computing environments. Further, malware authors continually adapt their techniques to evade detection, and an ongoing need exists for improved techniques to detect malware and prevent its harm in a variety of situations.

BRIEF DESCRIPTION OF THE DRAWINGS

Various embodiments of the invention are disclosed in the following detailed description and the accompanying drawings.

FIG. 2D illustrates an example of a device discovery event.

FIG. 2E illustrates an example of a session event.

FIGS. 4A-4C illustrate examples of RADIUS messages sent by an IoT server to a AAA server on behalf of an IoT device in various embodiments.

FIG. 11 illustrates an embodiment of a set of correlation rules.

DETAILED DESCRIPTION

Figure 1:
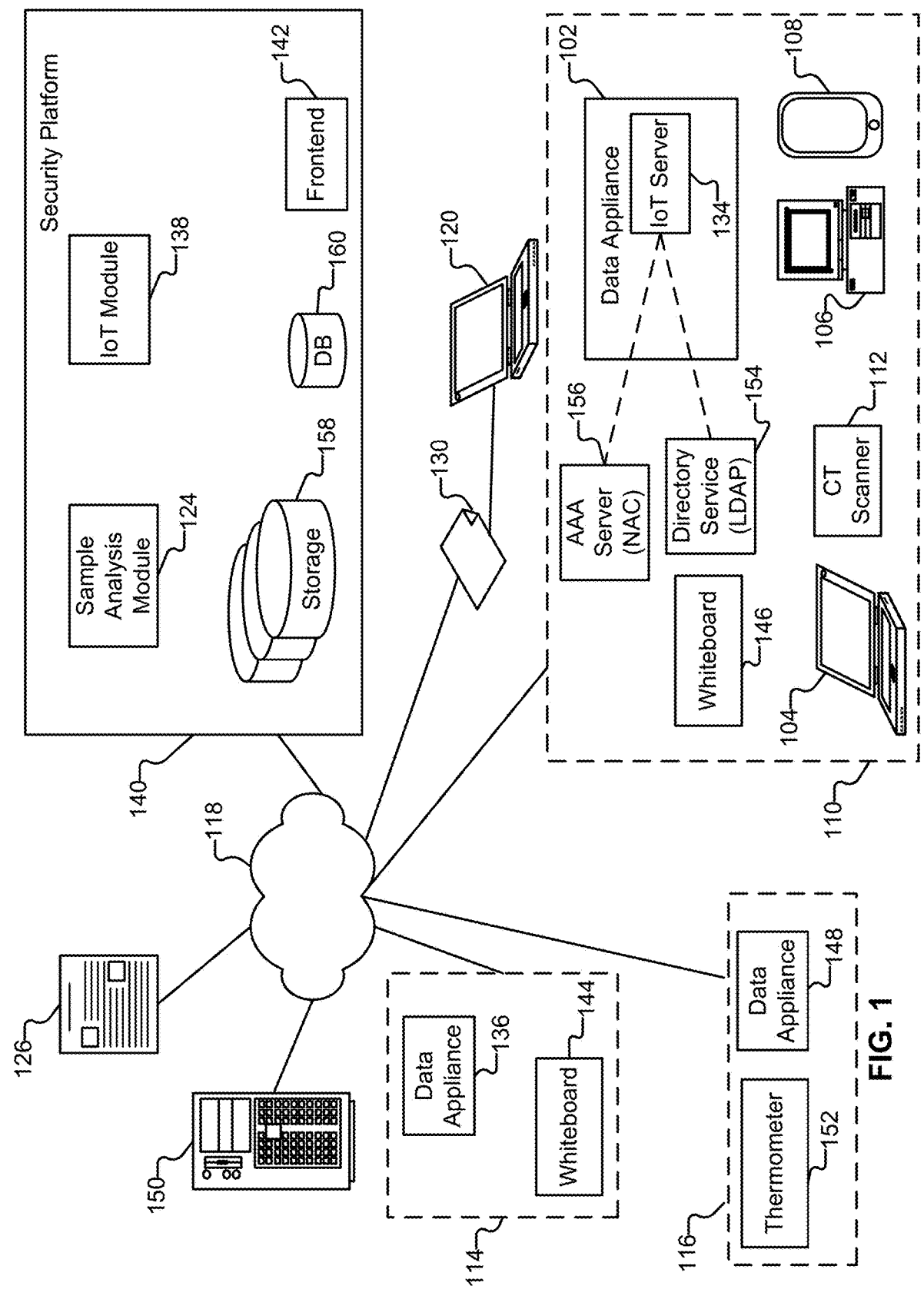
FIG. 1 illustrates an example of an environment in which malicious activity is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), Content-ID for real-time content scanning (e.g., controlling web surfing and limiting data and file transfers), and Device-ID (e.g., for IoT device type identification). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious activity is detected and its harm reduced. In the example shown in FIG. 1, client devices 104-108 are a laptop computer, a desktop computer, and a tablet (respectively) present in an enterprise network 110 of a hospital (also referred to as "Acme Hospital"). Data appliance 102 is configured to enforce policies regarding communications between client devices, such as client devices 104 and 106, and nodes outside of enterprise network 110 (e.g., reachable via external network 118).

Examples of such policies include ones governing traffic shaping, quality of service, and routing of traffic. Other examples of policies include security policies such as ones requiring the scanning for threats in incoming (and/or outgoing) email attachments, web site content, files exchanged through instant messaging programs, and/or other file transfers. In some embodiments, data appliance 102 is also configured to enforce policies with respect to traffic that stays within enterprise network 110.

Network 110 also includes a directory service 154 and an Authentication, Authorization, and Accounting (AAA) server 156. In the example shown in FIG. 1, directory service 154 (also referred to as an identity provider or domain controller) makes use of the Lightweight Directory Access Protocol (LDAP) or other appropriate protocols. Directory service 154 is configured to manage user identity and credential information. One example of directory service 154 is a Microsoft Active Directory server. Other types of systems can also be used instead of an Active Directory server, such as a Kerberos-based system, and the techniques described herein adapted accordingly. In the example shown in FIG. 1, AAA server 156 is a network admission control (NAC) server. AAA server 156 is configured to authenticate wired, wireless, and VPN users and devices to a network, evaluate and remediate a device for policy compliance before permitting access to the network, differentiate access based on roles, and then audit and report on who is on the network. One example of AAA server 156 is a Cisco Identity Services Engine (ISE) server that makes use of the Remote Authentication Dial-In User Service (RADIUS). Other types of AAA servers can be used in conjunction with the techniques described herein, including ones that use protocols other than RADIUS.

In various embodiments, data appliance 102 is configured to listen to communications (e.g., passively monitor messages) to/from directory service 154 and/or AAA server 156. In various embodiments, data appliance 102 is configured to communicate with (i.e., actively communicate messages with) directory service 154 and/or AAA server 156. In various embodiments, data appliance 102 is configured to communicate with an orchestrator (not pictured) that communicates with (e.g., actively communicates messages with) various network elements such as directory service 154 and/or AAA server 156. Other types of servers can also be included in network 110 and can communicate with data appliance 102 as applicable, and directory service 154 and/or AAA server 156 can also be omitted from network 110 in various embodiments.

While depicted in FIG. 1 as having a single data appliance 102, a given network environment (e.g., network 110) can include multiple embodiments of data appliances, whether operating individually or in concert. Similarly, while the term "network" is generally referred to herein for simplicity in the singular (e.g., as "network 110"), the techniques described herein can be deployed in a variety of network environments of various sizes and topologies, comprising various mixes of networking technologies (e.g., virtual and physical), using various networking protocols (e.g., TCP and UDP) and infrastructure (e.g., switches and routers) across various network layers, as applicable.

Data appliance 102 can be configured to work in cooperation with a remote security platform 140. Security platform 140 can provide a variety of services, including performing static and dynamic analysis on malware samples (e.g., via sample analysis module 124), and providing a list of signatures of known-malicious files, domains, etc., to data appliances, such as data appliance 102 as part of a subscription. As will be described in more detail below, security platform 140 can also provide information (e.g., via IoT module 138) associated with the discovery, classification, management, etc., of IoT devices present within a network such as network 110. In various embodiments, signatures, results of analysis, and/or additional information (e.g., pertaining to samples, applications, domains, etc.) is stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives or other storage 158, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As examples, security platform 140 can perform static/dynamic analysis (e.g., via sample analysis module 124) and/or IoT device functionality (e.g., via IoT module 138) in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

Figure 2A:
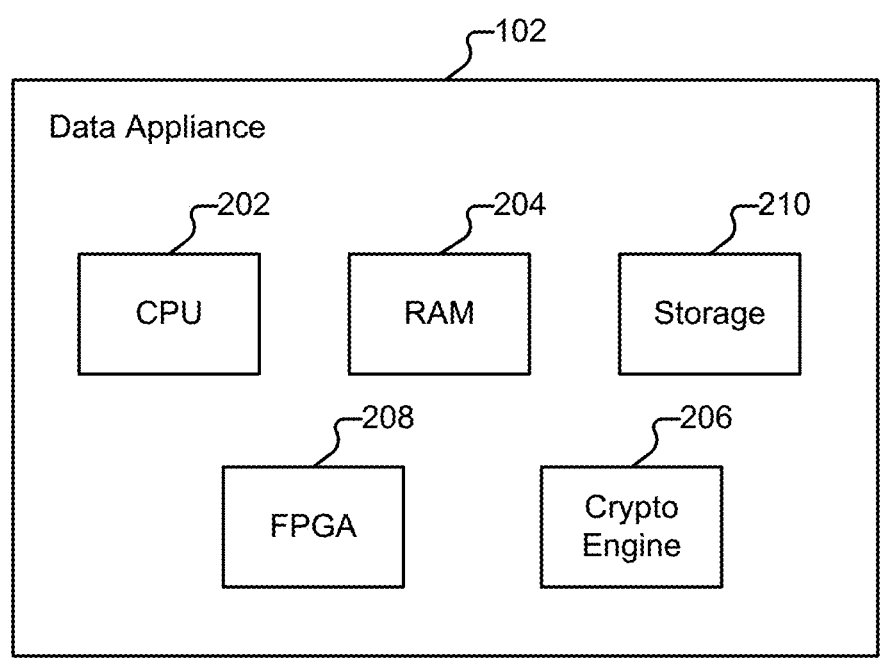
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, machine learning models, IoT device classification information, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. A given network environment may include multiple data appliances, each of which may be configured to provide services to a particular portion or portions of a network, may cooperate to provide services to a particular portion or portions of a network, etc. The functionality provided by data appliance 102 can also be integrated into or executed as software on a general purpose computer, a computer server, a gateway, and/or a network/routing device. In some embodiments, at least some functionality described as being provided by data appliance 102 is instead (or in addition) provided to a client device (e.g., client device 104 or client device 106) by software executing on the client device. Functionality described herein as being performed by data appliance 102 can also be performed at least partially by or in cooperation with security platform 140, and/or functionality described herein as being performed by security platform 140 can also be performed at least partially by or in cooperation with data appliance 102, as applicable. As one example, various functionality described as being performed by IoT module 138 can be performed by embodiments of IoT server 134.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on. Another example of a component included in data appliance 102 in various embodiments is an IoT server 134, described in more detail below. IoT server 134 can take a variety of forms, including as a standalone server (or set of servers), whether physical or virtualized, and can also be collocated with/incorporated into data appliance 102 as applicable (e.g., as shown in FIG. 1).

Figure 2B:
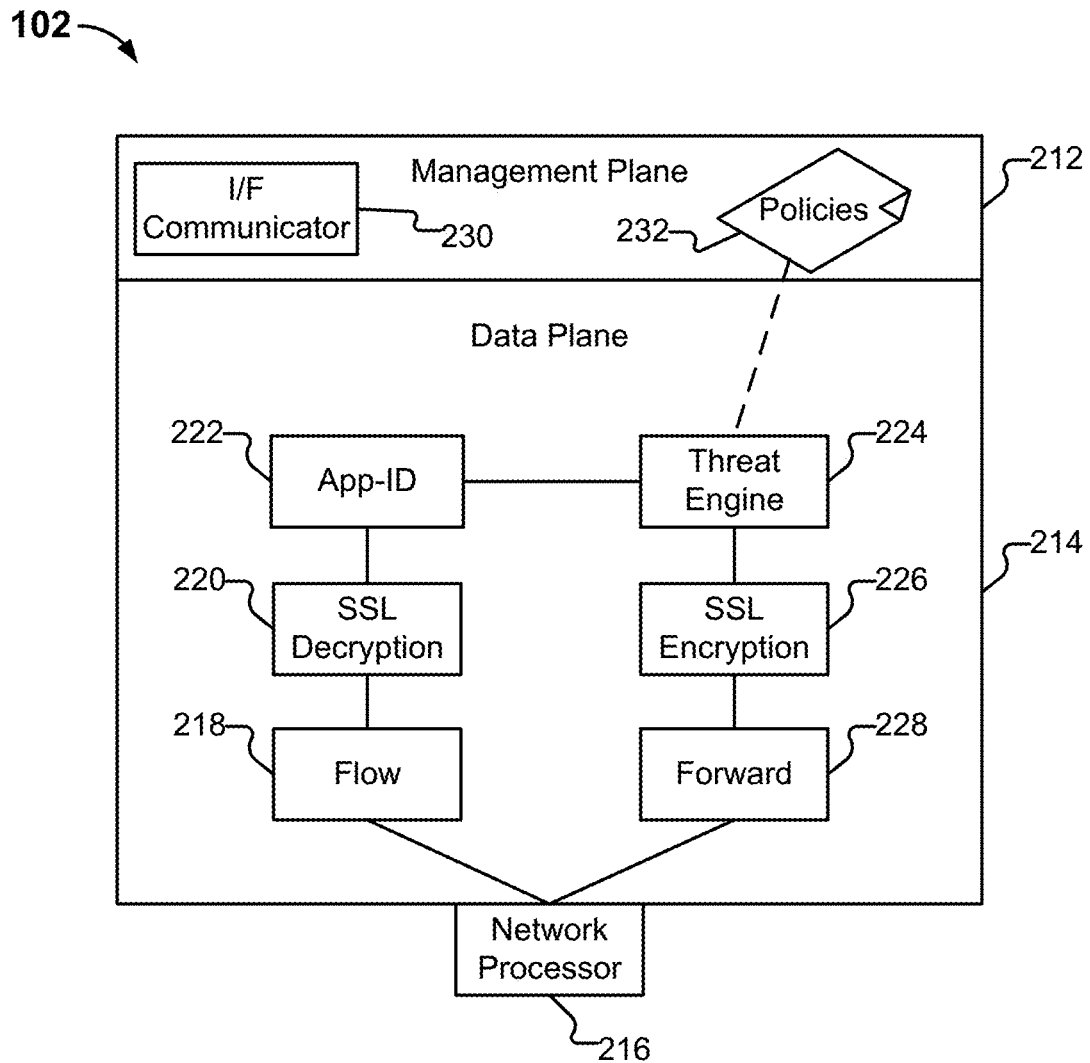
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 212 and a data plane 214. The management plane is responsible for managing user interactions, such as by providing a user interface for configuring policies and viewing log data. The data plane is responsible for managing data, such as by performing packet processing and session handling.

Network processor 216 is configured to receive packets from client devices, such as client device 108, and provide them to data plane 214 for processing. Whenever flow module 218 identifies packets as being part of a new session, it creates a new session flow. Subsequent packets will be identified as belonging to the session based on a flow lookup. If applicable, SSL decryption is applied by SSL decryption engine 220. Otherwise, processing by SSL decryption engine 220 is omitted. Decryption engine 220 can help data appliance 102 inspect and control SSL/TLS and SSH encrypted traffic, and thus help to stop threats that might otherwise remain hidden in encrypted traffic. Decryption engine 220 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 222 is configured to determine what type of traffic a session involves. As one example, application identification engine 222 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 222, the packets are sent, by threat engine 224, to an appropriate decoder configured to assemble packets (which may be received out of order) into the correct order, perform tokenization, and extract out information. Threat engine 224 also performs signature matching to determine what should happen to the packet. As needed, SSL encryption engine 226 can re-encrypt decrypted data. Packets are forwarded using a forward module 228 for transmission (e.g., to a destination).

As also shown in FIG. 2B, policies 232 are received and stored in management plane 212. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 230 is provided for management communications (e.g., via (REST) APIs, messages, or network protocol communications or other communication mechanisms). Policies 232 can also include policies for managing communications involving IoT devices.

III. IoT Device Discovery and Identification

Returning to FIG. 1, suppose that a malicious individual (e.g., using system 120) has created malware 130. The malicious individual hopes that vulnerable client devices will execute a copy of malware 130, compromising the client device, and causing the client device to become a bot in a botnet. The compromised client device can then be instructed to perform tasks (e.g., cryptocurrency mining, participating in denial of service attacks, and propagating to other vulnerable client devices) and to report information or otherwise exfiltrate data to an external entity (e.g., command and control (C&C) server 150), as well as to receive instructions from C&C server 150, as applicable.

Some client devices depicted in FIG. 1 are commodity computing devices typically used within an enterprise organization. For example, client devices 104, 106, and 108 each execute typical operating systems (e.g., macOS, Windows, Linux, Android, etc.). Such commodity computing devices are often provisioned and maintained by administrators (e.g., as company-issued laptops, desktops, and tablets, respectively) and often operated in conjunction with user accounts (e.g., managed by a directory service provider (also referred to as a domain controller) configured with user identity and credential information). As one example, an employee Alice might be issued laptop 104 which she uses to access her ACME-related email and perform various ACME-related tasks. Other types of client devices (referred to herein generally as Internet of Things or IoT devices) are increasingly also present in networks and are often "unmanaged" by the IT department. Some such devices (e.g., teleconferencing devices) may be found across a variety of different types of enterprises (e.g., as IoT whiteboards 144 and 146). Such devices may also be vertical specific. For example, infusion pumps and computerized tomography scanners (e.g., CT scanner 112) are examples of IoT devices that may be found within a healthcare enterprise network (e.g., network 110), and robotic arms are an example of devices that may be found in a manufacturing enterprise network. Further, consumer-oriented IoT devices (e.g., cameras) may also be present in an enterprise network. As with commodity computing devices, IoT devices present within a network may communicate with resources that are both internal or external to such networks (or both, as applicable).

As with commodity computing devices, IoT devices are a target of nefarious individuals. Unfortunately, the presence of IoT devices in a network can present several unique security/administrative challenges. IoT devices are often low-power devices or special purpose devices and are often deployed without the knowledge of network administrators. Even where known to such administrators, it may not be possible to install endpoint protection software or agents on IoT devices. IoT devices may be managed by and communicate solely/directly with third party cloud infrastructure (e.g., with industrial thermometer 152 communicating directly with cloud infrastructure 126) using proprietary (or otherwise non-standard) protocols. This can confound attempts to monitor network traffic in and out of such devices to make decisions about when a threat or attack is happening against the device. Further, some IoT devices (e.g., in a healthcare environment) are mission critical (e.g., a network connected surgical system). Unfortunately, compromise of an IoT device (e.g., by malware 130) or the misapplication of security policies against traffic associated with an IoT device can have potentially catastrophic implications. Using techniques described herein, the security of heterogeneous networks that include IoT devices can be improved and the harms posed to such networks can be reduced.

In various embodiments, data appliance 102 includes an IoT server 134. IoT server 134 is configured to identify IoT devices within a network (e.g., network 110), in some embodiments, in cooperation with IoT module 138 of security platform 140. Such identification can be used, e.g., by data appliance 102, to help make and enforce policies regarding traffic associated with IoT devices, and to enhance the functionality of other elements of network 110 (e.g., providing contextual information to AAA 156). In various embodiments, IoT server 134 incorporates one or more network sensors configured to passively sniff/monitor traffic. One example way to provide such network sensor functionality is as a tap interface or switch mirror port. Other approaches to monitoring traffic can also be used (in addition or instead) as applicable.

Figure 2C:
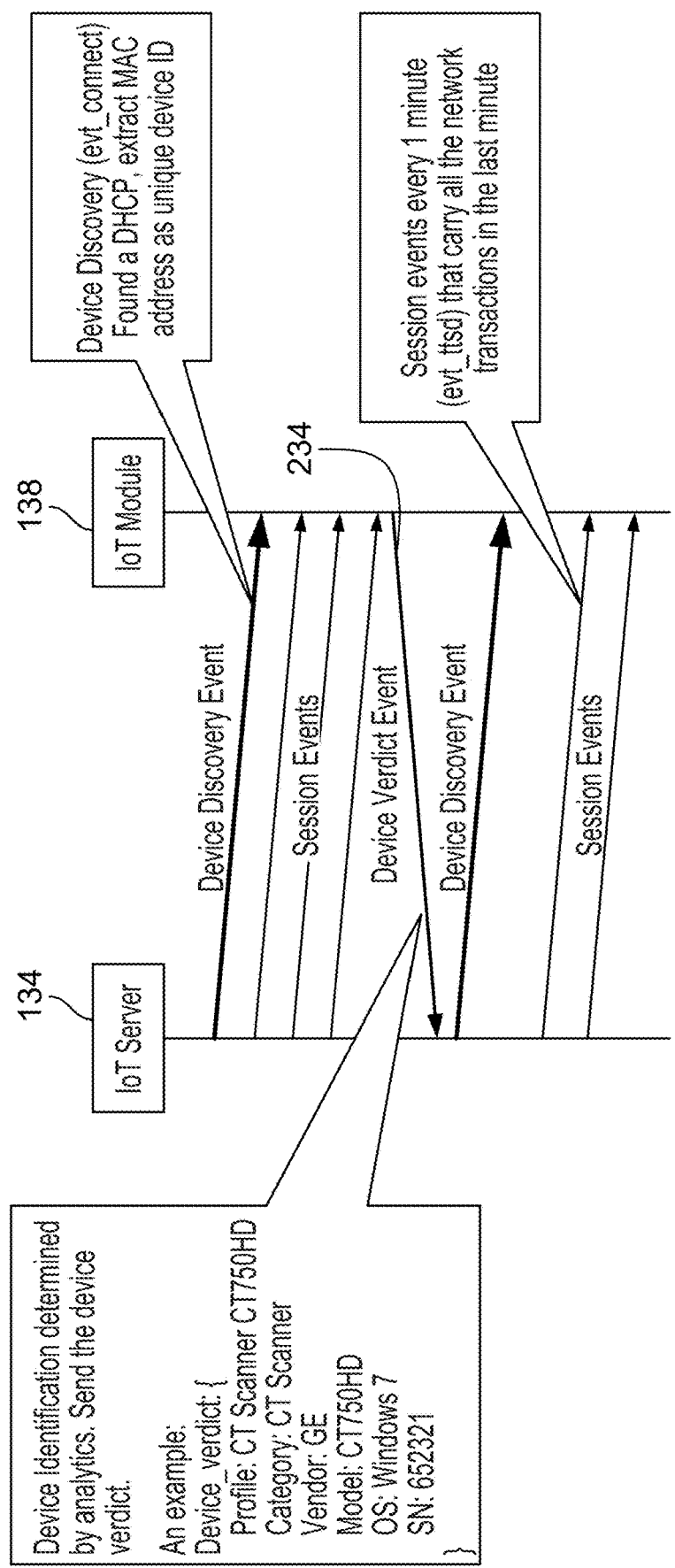
FIG. 2C illustrates an example event path between an IoT server and an IoT module.

In various embodiments, IoT server 134 is configured to provide log or other data (e.g., collected from passively monitoring network 110) to IoT module 138 (e.g., via frontend 142). FIG. 2C illustrates an example event path between an IoT server and an IoT module. IoT server 134 sends device discovery events and session events to IoT module 138. An example discovery event and a session event are illustrated in FIGS. 2D and 2E, respectively. In various embodiments, discovery events are sent by IoT server 134 whenever it observes a packet that can uniquely identify or confirm the identity of a device (e.g., whenever a DHCP, UPNP, or SMB packet is observed). Each session that a device has (with other nodes, whether inside or outside the device's network) is described within a session event that summarizes information about the session (e.g., source/destination information, number of packets received/sent, etc.). As applicable, multiple session events can be batched together by IoT server 134 prior to sending to IoT module 138. In the example shown in FIG. 2E, two sessions are included. IoT module 138 provides IoT server 134 with device classification information via device verdict events (234).

One example way of implementing IoT module 138 is using a microservices-based architecture. IoT module 138 can also be implemented using different programming languages, databases, hardware, and software environments, as applicable, and/or as services that are messaging enabled, bounded by contexts, autonomously developed, independently deployable, decentralized, and built and released with automated processes. One task performed by IoT module 138 is to identify IoT devices in the data provided by IoT server 134 (and provided by other embodiments of data appliances such as data appliances 136 and 148) and to provide additional contextual information about those devices (e.g., back to the respective data appliances).

Figure 2F:
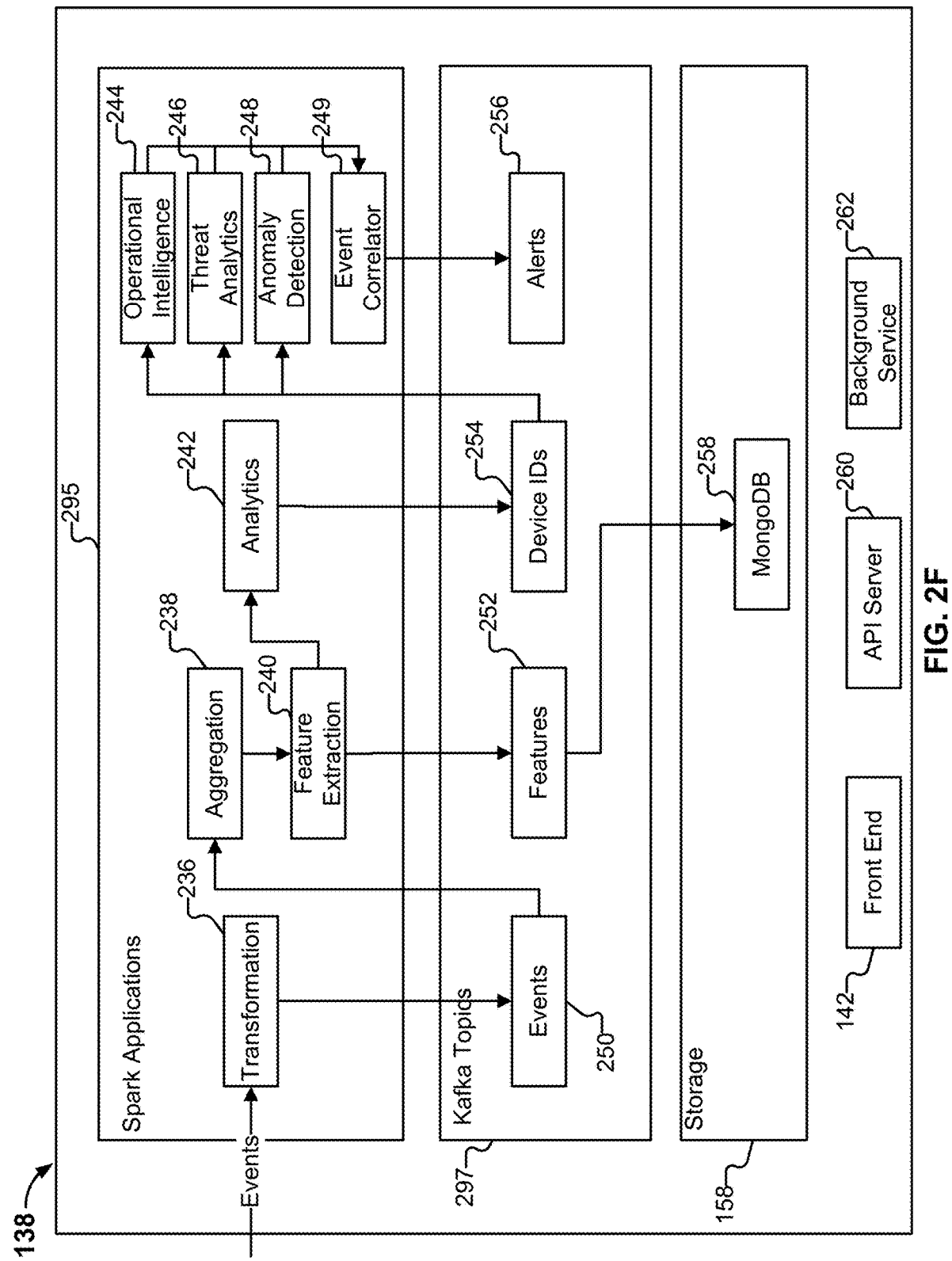
FIG. 2F illustrates an embodiment of an IoT module.

FIG. 2F illustrates an embodiment of an IoT module. Region 295 depicts a set of Spark Applications that run on intervals (e.g., every five minutes, every hour, and every day) across the data of all tenants. Region 297 depicts a Kafka message bus. Session event messages received by IoT module 138 (e.g., from IoT server 134) bundle together multiple events as observed at IoT server 134 (e.g., in order to conserve bandwidth). Transformation module 236 is configured to flatten the received session events into individual events and publish them at 250. The flattened events are aggregated by aggregation module 238 using a variety of different aggregation rules. An example rule is "for the time interval (e.g., 5 minutes), aggregate all event data for a specific device and each (APP-ID) application it used." Another example rule is "for the time interval (e.g., 1 hour), aggregate all event data for a particular device communicating with a particular destination IP address." For each rule, aggregation engine 238 tracks a list of attributes that need to be aggregated (e.g., a list of applications used by a device or a list of destination IP addresses). Feature extraction module 240 extracts features (252) from the attributes. Analytics module 242 uses the extracted features to perform device classification (e.g., using supervised and unsupervised learning), the results of which (254) are used to power other types of analytics (e.g., via operational intelligence module 244, threat analytics module 246, and anomaly detection module 248). Operational intelligence module 244 provides analytics related to the OT framework and operational or business intelligence (e.g., how a device is being used). Event correlator 249 correlates information provided by various modules (e.g., modules 244-248). Alerts (256) can be generated based on results of the analytics. In various embodiments, MongoDB 258 is used to store aggregated data and feature values. Background services 262 receive data aggregated by Spark applications and write data to MongoDB 258. API Server 260 pulls and merges data from MongoDB 258 to serve requests received from Front End 142.

Figure 2G:
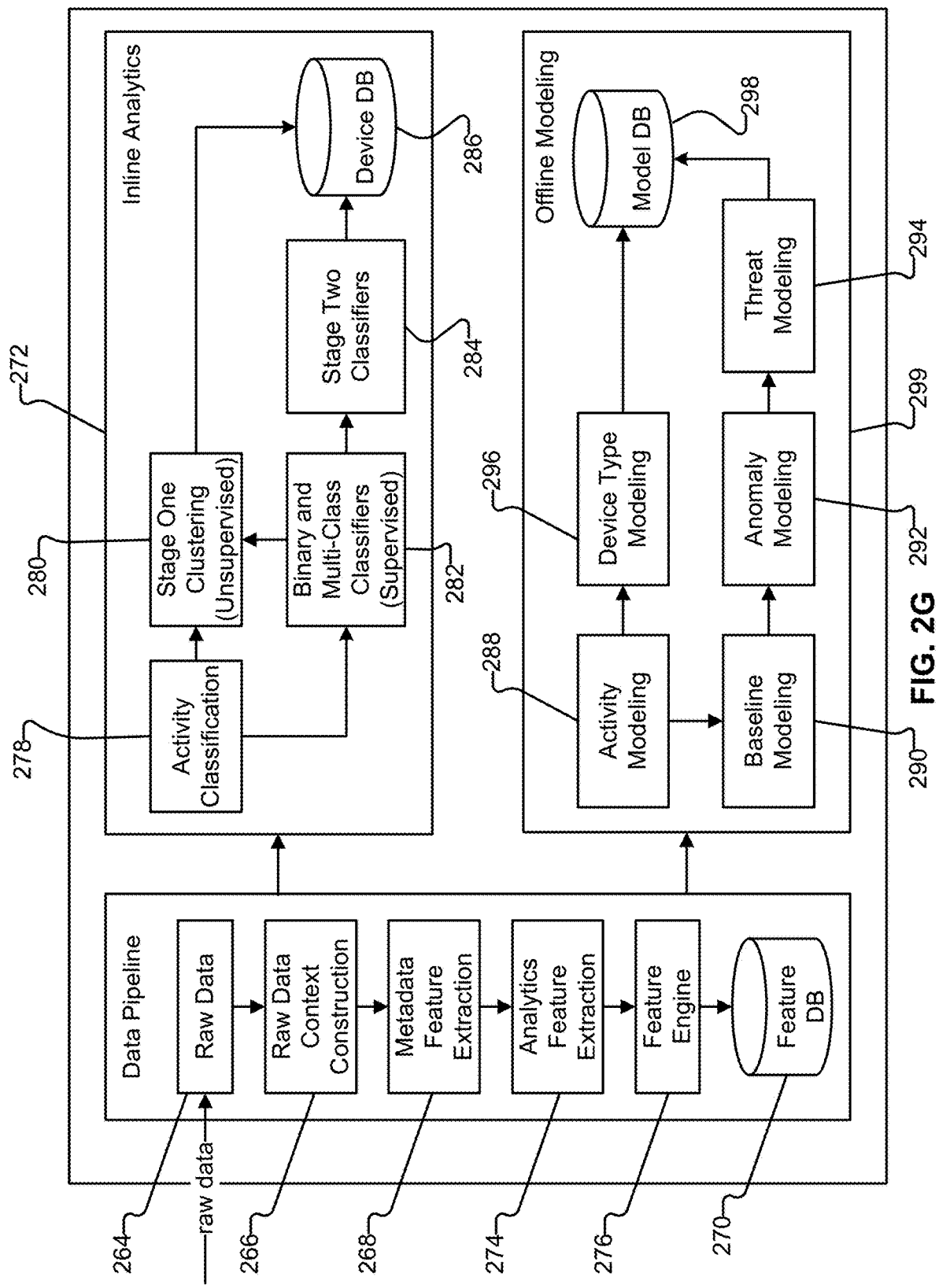
FIG. 2G illustrates an example way of implementing IoT device analytics.

FIG. 2G illustrates an example way of implementing IoT device identification analytics (e.g., within IoT module 138 as an embodiment of analytics module 242 and related elements). Discovery events and session events (e.g., as shown in FIGS. 2D and 2E, respectively) are received as raw data 264 on a message bus as a Kafka topic (and are also stored in storage 158). Features are extracted by feature engine 276 (which can, for example, be implemented using Spark/MapReducer). The raw data is enriched (266) with additional contextual information by security platform 140, such as geolocation information (e.g., of the source/destination addresses). During metadata feature extraction (268), features such as the number of packets sent within a time interval from an IP address, the number of applications used by a particular device during the time interval, and the number of IP addresses contacted by the device during the time interval are constructed. The features are both passed (e.g., on a message bus) in realtime to inline analytics engine 272 (e.g., in JSON format) and stored (e.g., in feature database 270 in an appropriate format such as Apache Parquet/DataFrame) for subsequent querying (e.g., during offline modeling 299).

In addition to features built from metadata, a second type of features can be built by IoT module 138 (274), referred to herein as analytics features. An example analytics feature is one built over time based on time-series data, using aggregate data. Analytics features are similarly passed in realtime to analytics engine 272 and stored in feature database 270.

Inline analytics engine 272 receives features on a message bus via a message handler. One task performed is activity classification (278), which attempts to identify activities (such as file download, login/authentication process, or disk backup activity) associated with the session based on the received feature values/session information and attaches any applicable tags. One way of implementing activity classification 278 is via a neural network-based multi-layer perceptron combined with a convolutional neural network.

Suppose, as a result of activity classification, it is determined that a particular device is engaging in printing activities (i.e., using printing protocols) and is also periodically contacting resources owned by HP (e.g., to check for updates by calling an HP URL and using it to report status information). In various embodiments, the classification information is passed to both a clustering process (unsupervised) and a prediction process (supervised). If either process results in a successful classification of the device, the classification is stored in device database 286.

A device can be clustered, by stage one clustering engine 280, into multiple clusters (e.g., acts like a printer, acts like an HP device, etc.) based on its attributes and other behavior patterns. One way of implementing clustering engine 280 is using an extreme gradient boosting framework (e.g., XGB). The stage one classifier can be useful for classifying devices that have not previously been seen but are similar to existing known devices (e.g., a new vendor of thermostats begins selling thermostat devices that behave similarly to known thermostats).

As shown in FIG. 2G, activity classification information is also provided to a set of classifiers 282 and a prediction is performed based on the provided features for the device. Two possibilities can occur. In a first scenario, it is determined that there is a high probability that the device matches a known device profile (i.e., a high confidence score). If so, information about the device is provided to a stage two classifier (284) that makes a final verdict for the device's identification (e.g., using the information it was provided and any additional applicable contextual information) and updates device database 286 accordingly. One way of implementing a stage two classifier is using a gradient boosting framework. In a second scenario, suppose the confidence score is low (e.g., the device matches both an HP printer and an HP laptop with 50% confidence). In this scenario, the information determined by classifiers 282 can be provided to clustering engine 280 as additional information usable in clustering.

Also shown in FIG. 2G is an offline modeling module 299. Offline modeling module 299 is contrasted with inline analytics engine 272 as it is not time constrained (whereas inline analytics engine 272 attempts to provide device classification information in realtime (e.g., as message 234)). Periodically (e.g., once per day or once per week), offline modeling module 299 (implemented, e.g., using Python) rebuilds models used by inline analytics module 272. Activity modeling engine 288 builds models for activity classifier 278, which are also used for device type models (296) which are used by classifiers for device identification during inline analytics. Baseline modeling engine 290 builds models of baseline behaviors of device models, which are also used when modeling specific types of device anomalies (292) and specific types of threats (294), such as a kill chain. The generated models are stored, in various embodiments, in model database 298.

IV. Network Entity Id Aaa

Suppose, as was previously mentioned, Alice was issued a laptop 104 by ACME. Various components of network 110 will cooperate to authenticate Alice's laptop as she uses it to access various resources. As one example, when Alice connects laptop 104 to a wireless access point located within network 110 (not pictured), the wireless access point may communicate (whether directly or indirectly) with AAA server 156 while provisioning network access. As another example, when Alice uses laptop 104 to access her ACME email, laptop 104 may communicate (whether directly or indirectly) with directory service 154 while fetching her inbox, etc. As a commodity laptop running a commodity operating system, laptop 104 is able to generate appropriate AAA messages (e.g., RADIUS client messages) which will help laptop 104 gain access to the appropriate resources it needs.

As previously mentioned, one problem posed by IoT devices (e.g., device 146) in a network such as 110 is that such devices are often "unmanaged" (e.g., not configured, provisioned, managed by network administrators, etc.), do not support protocols such as RADIUS, and thus cannot be integrated with AAA services such as other devices such as laptop 104. A variety of approaches can be adopted to provide IoT devices with network access within network 110, each of which has drawbacks. One option is for ACME to limit IoT devices to use of a guest network (e.g., via a pre-shared key). Unfortunately, this can limit the utility of the IoT device if it is unable to communicate with other nodes within network 110 to which it should legitimately have access. Another option is to allow IoT devices unlimited access to network 110, mitigating the security benefits of having a segmented network. Yet another option is for ACME to manually specify rules that govern how a given IoT device should be able to access resources in network 110. This approach is generally untenable/unworkable for a variety of reasons. As one example, administrators may often not be involved in the deployment of IoT devices and thus will not know that policies for such devices should be included (e.g., in data appliance 102). Even where administrators might, e.g., manually configure policies for specific IoT devices in appliance 102 (e.g., for devices such as device 112), keeping such policies up to date is error prone and is generally untenable given the sheer number of IoT devices that might be present in network 110. Further, such policies will likely be simplistic (e.g., assigning CT scanner 112 by IP address and/or MAC address to a particular network) and not allow for finer grained control over connections/policies involving CT scanner 112 (e.g., dynamically including with policies applicable to surgical devices vs. point of sales terminals). Further, even where CT scanner 112 is manually included in data appliance 102, as previously mentioned, IoT devices will generally not support technologies such as RADIUS, and the benefits in having such AAA servers manage CT scanner 112's networking access will be limited as compared to other types of devices (e.g., laptop 104) which more fully support such technologies. As will be described in more detail below, in various embodiments, data appliance 102 (e.g., via IoT server 134) is configured to provide support for AAA functionality to IoT devices present in network 110 in a passive manner.

In the following discussion, suppose that Alice's department in ACME has recently purchased an interactive whiteboard 146 so that Alice can collaborate with other ACME employees as well as individuals outside of ACME (e.g., Bob, a researcher at Beta University having its own network 114, data appliance 136, and whiteboard 144). As part of the initial setup of whiteboard 146, Alice connects it to a power source and provides it with a wired connection (e.g., to an outlet in the conference room) or wireless credentials (e.g., the credentials for use by visitors of the conference room). When whiteboard 146 provisions a network connection, IoT server 134 (e.g., via a mechanism such as a network sensor as described above) will recognize whiteboard 146 as a new device within network 110. One action taken in response to this detection is to communicate with security platform 140 (e.g., creating a new record for whiteboard 146 in database 160 and retrieving any currently available contextual information associated with whiteboard 146 (e.g., obtaining the manufacturer of whiteboard 146, model of whiteboard 146, etc.)). Any contextual information provided by security platform 140 can be provided to (and stored at) data appliance 102 which can in turn provide it to directory service 154 and/or AAA server 156 as applicable. As applicable, IoT module 138 can provide updated contextual information about whiteboard 146 to data appliance 102 as it becomes available. And, data appliance 102 (e.g., via IoT server 134) can similarly provide security platform 140 with ongoing information about whiteboard 146. Examples of such information include observations about whiteboard 146's behaviors on network 110 (e.g., statistical information about the connections it makes) which can be used by security platform 140 to build behavioral profiles for devices such as whiteboard 146. Similar behavior profiles can be built by security platform 140 for other devices (e.g., whiteboard 144). Such profiles can be used for a variety of purposes, including detecting anomalous behaviors. As one example, data appliance 148 can use information provided by security platform 140 to detect whether thermometer 152 is operating anomalously as compared to historic observations of thermometer 152, and/or as compared to other thermometers (not pictured) of similar model, manufacturer, or more generally, including thermometers present in other networks. If anomalous behavior is detected (e.g., by data appliance 148), appropriate remedial action can be automatically taken, such as restricting thermometer 152's access to other nodes on network 116, generating an alert, etc.

Figure 3:
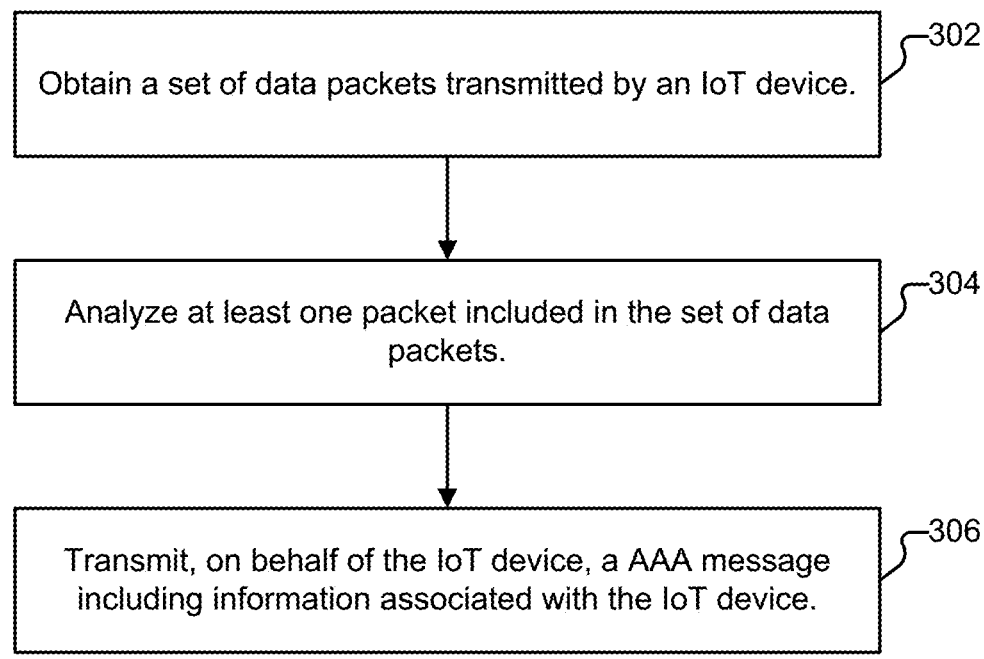
FIG. 3 illustrates an embodiment of a process for passively providing AAA support for an IoT device in a network.

FIG. 3 illustrates an embodiment of a process for passively providing AAA support for an IoT device in a network. In various embodiments, process 300 is performed by IoT server 134. The process begins at 302 when a set of packets transmitted by an IoT device is obtained. As one example, when whiteboard 146 is first provisioned on network 110, such packets can be passively received by IoT server 134 at 302. Packets can also be received at 302 during subsequent use of whiteboard 146 (e.g., as Alice has whiteboarding sessions with Bob via whiteboard 144). At 304, at least one packet included in the set of data packets is analyzed. As one example of the processing performed at 304, IoT server 134 determines that the packets received at 302 are being transmitted by whiteboard 146. One action that IoT server 134 can take is to identify whiteboard 146 as a new IoT device on network 110 and obtain contextual information from IoT module 138 if available. At 306, IoT server 134 transmits, on behalf of the IoT device, a AAA message that includes information associated with the IoT device. An example of such a message is shown in FIG. 4A. As previously mentioned, whiteboard 146 does not support the RADIUS protocol. However, IoT server 134 can generate a message such as is depicted in FIG. 4A (e.g., using information received at 302 and also from security platform 140 as applicable) on behalf of whiteboard 146. As previously mentioned, when IoT server 134 provides information about whiteboard 146 to IoT module 138, IoT module 138 can take a variety of actions such as creating a record for whiteboard 146 in database 160 and populating that record with contextual information about whiteboard 146 (e.g., determining its manufacturer, model number, etc.). As additional contextual information about whiteboard 146 is gathered by security platform 140, its profile can be updated and propagated to data appliance 102. When whiteboard 146 is initially provisioned within network 110, no additional contextual information may be available (e.g., security platform 140 may not have such additional information or providing such information by security platform 140 to IoT server 134 may not be instant). Accordingly, and as is depicted in FIG. 4A, the RADIUS message generated by IoT server 134 on behalf of whiteboard 146 may include limited information. As additional contextual information is received (e.g., by IoT server 134 from IoT module 138), subsequent RADIUS messages sent by IoT server 134 on behalf of whiteboard 146 can be enriched with such additional information. Examples of such subsequent messages are illustrated in FIGS. 4B and 4C. FIG. 4B illustrates an example of a RADIUS message that IoT server 134 can send on behalf of whiteboard 146 once contextual information about whiteboard 146 has been provided by IoT module 138 (e.g., which contains a database of contextual information about a wide variety of IoT devices). In the example shown in FIG. 4B, contextual information such as the manufacturer of the whiteboard (Panasonic) and the nature of the device (e.g., it is an interactive whiteboard) is included. Such contextual information can be used by AAA servers such as AAA server 156 to provide AAA services to whiteboard 146 (without having to modify whiteboard 146), such as by automatically provisioning it on a subnetwork dedicated to teleconferencing equipment. Other types of IoT devices can also be automatically grouped based on attributes such as device type, purpose, etc. (e.g., with critical surgical equipment automatically provisioned on a subnetwork dedicated to such equipment and thus isolated from other devices on the network). Such contextual information can be used to enforce policies such as traffic shaping policies, such as a policy giving preferential treatment to whiteboard 146 packets over social networking packets (e.g., as determined using APP-ID). Fine-grained policies could similarly be applied to communications with critical surgical equipment (e.g., preventing any device in communication with such equipment from having an out of date operating system, etc.). In the example shown in FIG. 4C, yet more additional contextual information is included by IoT server 134 in RADIUS messages on behalf of whiteboard 146. Such additional contextual information includes additional attribute information such as the device model, operating system, and operating version. When whiteboard 146 is initially provisioned in network 110, all of the contextual information depicted in FIG. 4C will likely not be available. As whiteboard 146 is used within network 110 over time, additional contextual information can be collected (e.g., as IoT server 134 continues to passively observe packets from whiteboard 146 and provide information to security platform 140). This additional information can be leveraged (e.g., by data appliance 102) to enforce fine-grained policies. As one example, as shown in FIG. 4C, whiteboard 146 runs a particular operating system that is Linux-based and has a version of 3.16. Frequently, IoT devices will run versions of operating systems that are not upgradable/not patchable. Such devices can pose security risks as exploits are developed for those operating systems. Data appliance 102 can implement security policies based on contextual information such as by isolating IoT devices having out of date operating systems from other nodes in network 110 (or otherwise limiting their access) while permitting less restrictive network access to those with current operating systems, etc.

FIGS. 4A-4C depict examples of RADIUS access request messages. As applicable, IoT server 134 can generate a variety of types of RADIUS messages on behalf of whiteboard 146. As one example, RADIUS accounting start messages can be triggered when traffic from whiteboard 146 is first observed. Periodic RADIUS accounting interim update messages can be sent while the whiteboard is in use, and RADIUS accounting stop messages can be sent when whiteboard 146 goes offline.

V. IoT Device Discovery and Identification

As discussed above, one task performed by security platform 140 (e.g., via IoT module 138) is IoT device classification. As an example, when IoT server 134 transmits a device discovery message to IoT module 138, IoT module 138 attempts to determine a classification for the device and respond (e.g., with verdict 234 shown in FIG. 2C). The device is associated by IoT module 138 with a unique identifier so that, as applicable, subsequent classification of the device need not be performed (or, as applicable, performed less frequently than would otherwise be performed). Also as discussed above, the determined classification can be used (e.g., by data appliance 102) to enforce policies against traffic to/from the device.

A variety of approaches can be used to classify a device. A first approach is to perform classification based on a set of rules/heuristics that leverage the device's static attributes, such as an organizationally unique identifier (OUI), the types of applications it executes, etc. A second approach is to perform classification using machine learning techniques that leverage the device's dynamic, but predefined attributes extracted from its network traffic (e.g., number of packets sent per day). Unfortunately, both of these approaches have weaknesses.

A rule-based approach generally requires that a separate rule be manually created for each type of IoT device (describing which attributes/values should be used as a signature for a type of device's signature). One challenge presented by this approach is in determining which signatures are both relevant to identifying a device and unique among other device signatures. Further, with a rule-based approach, a limited number of static attributes that can easily be acquired from traffic are available (e.g., user agent, OUI, URL destination, etc.). The attributes generally need to be simple enough that they show up in a pattern that a regular expression can match on. Another challenge is in identifying new static attributes that may be present/identifiable as new devices enter a market (e.g., a new brand or model of CT scanner is offered). Another challenge is that all matching attributes in the network traffic need to be collected in order for a rule to be triggered. A verdict cannot be reached with fewer attributes. As an example, a signature may require a particular device with a particular OUI to connect to a particular URL. Having the OUI itself may already be a sufficient indicator of a device's identity, but the signature will not trigger until the URL is also observed. This would cause further delay in determining the device's identity. Another challenge is maintaining and updating signatures as static attributes for a device change over time (e.g., because of updates made to the device or services used by the device). As an example, a particular device may have initially been manufactured using a first type of network card, but over time the manufacturer may have switched to a different network card (which will exhibit a different OUI). If a rule-based system is unaware of the change, false positives may result. Yet another challenge is in scaling signature generation/verification when the number of new IoT devices brought online each day approaches millions of new device instances. As a result, newly created rules may conflict with existing rules and causing false positives in classification.

A machine learning-based approach generally involves creating training models based on static and/or dynamic features extracted from network traffic. The result of prediction on network data from a new IoT device is based on pre-trained models that provide an identity of a device with an associated accuracy. Examples of problems with a machine learning approach are as follows. The computation time required to reach a desired accuracy may be unacceptable, where prediction is done on every new device, or a device without a constant/unique ID (e.g., a MAC address). There may be thousands or tens of thousands of features that need to be generated, and those features may transform over a predefined time window, taking significant time (which may defeat the purpose of policy enforcement) before a sufficient number of features are available to make an effective prediction. Further, the cost could be high to build and maintain a large data pipeline for streaming network data if a goal is to minimize a delay in prediction. Yet another problem is that noise brought in by irrelevant features specific to a given deployment environment could decrease the accuracy of a prediction. And, there is a challenge in maintaining and updating models when the number of device types reaches the tens of thousands or higher.

In various embodiments, security platform 140 addresses the problems of each of the two aforementioned approaches by using a hybrid approach to classification. In an example hybrid approach, a network behavior pattern identifier (also referred to herein as a pattern ID) is generated for each type of device. In various embodiments, a pattern ID is a list of attributes or sequence features combined, with their respective probabilities (as importance scores for a feature or behavior category), that forms a distinct network behavior description and can be used to identify the type of an IoT device. The pattern IDs can be stored (e.g., in a database) and used to identify/verify the identity of devices.

When training on a set of attributes, certain approaches, such as an extreme gradient boosting framework (e.g., XGB), can provide a top list of important features (whether static attributes, dynamic attributes, and/or aggregated/transformed values). The pattern ID can be used to uniquely identify a device type once established. If particular features are dominant for a device (e.g., a particular static feature (such as contacting a highly-specific URL at boot time) identifies a device with 98% confidence), they can be used to automatically generate a rule. Even where no dominant features are present, a representation of the top features can nonetheless be used as the pattern ID (e.g., where a set of multiple features are concatenated into a pattern). By training on a data set that includes all known models (and all known IoT devices), potential conflict between models/uniquely identifying features can be avoided. Further, the pattern ID need not be human-readable (but can be stored, shared, and/or reused for identification purposes). Significant time savings can also be realized by this approach, such that it can be used in near-realtime classification. As soon as a dominant feature is observed, classification of a particular device can occur (instead of having to wait until a large number of features occur).

An example of data that could be used to create a pattern ID for a "Teem Room Display iPad" device could include the following (with a full list automatically generated through training of a multivariate model or training multiple binary models):

Apple device (100%)
Special iPad (>98.5%)
Teem Room App (>95%)
Meeting volume pattern VPM-17 (>95%)
Server-in-the-cloud (>80%)

An example way of implementing a hybrid approach is as follows. A neural network-based machine learning system can be used for automated pattern ID training and generation. Examples of features that can be used to train the neural network model include both static features extracted from network traffic (e.g., OUI, hostname, TLS fingerprint, matched L7 payload signatures, etc.) and sequence features extracted from network traffic but not specific to the environment (e.g., applications, L7 attributes of an application, volume range converted to categorical features, etc.). A lightweight data pipeline can be used to stream selected network data for feature generation in realtime. A prediction engine can be used that imports models and provides caching to minimize delays in prediction. In prediction, a short (e.g., minute-based) aggregation can be used to stabilize the selected sequence features. Customized data normalization, enrichment, aggregation, and transformation techniques can be used to engineer the sequence features. A longer aggregation window can be used in training for better accuracy. Accuracy can be improved for prediction with features being merged and aggregated over time. A backend feedback engine can be used to route the results of a "slow path" prediction system (e.g., a machine learning-based approach that includes a device type modeling subsystem and a device group modeling subsystem) that helps expand attributes used for pattern ID prediction. A device group model can be trained to compensate for issues with a device type model when not enough samples or features are available, to improve the accuracy over an acceptable threshold (e.g., assigning prediction results based on a set of predefined types, some of which come with another subsystem to cluster similar types of devices that are unlabeled). Finally, a verdict module can be used to publish results from the realtime prediction engine.

Example advantages of a hybrid approach to classification such as is described herein are as follows. First, fast convergence can occur, allowing for a given device to be potentially identified within minutes or seconds. Second, it addresses individual problems of rule-based and machine learning-based systems. Third, it provides stability and consistency in prediction results. Fourth, it has scalability to support tens of thousands (or more) different types of IoT devices. Prediction is generally only required on new devices (even if a given device lacks a unique ID assignment, such as an L3 network traffic-based identification).

Figure 5:
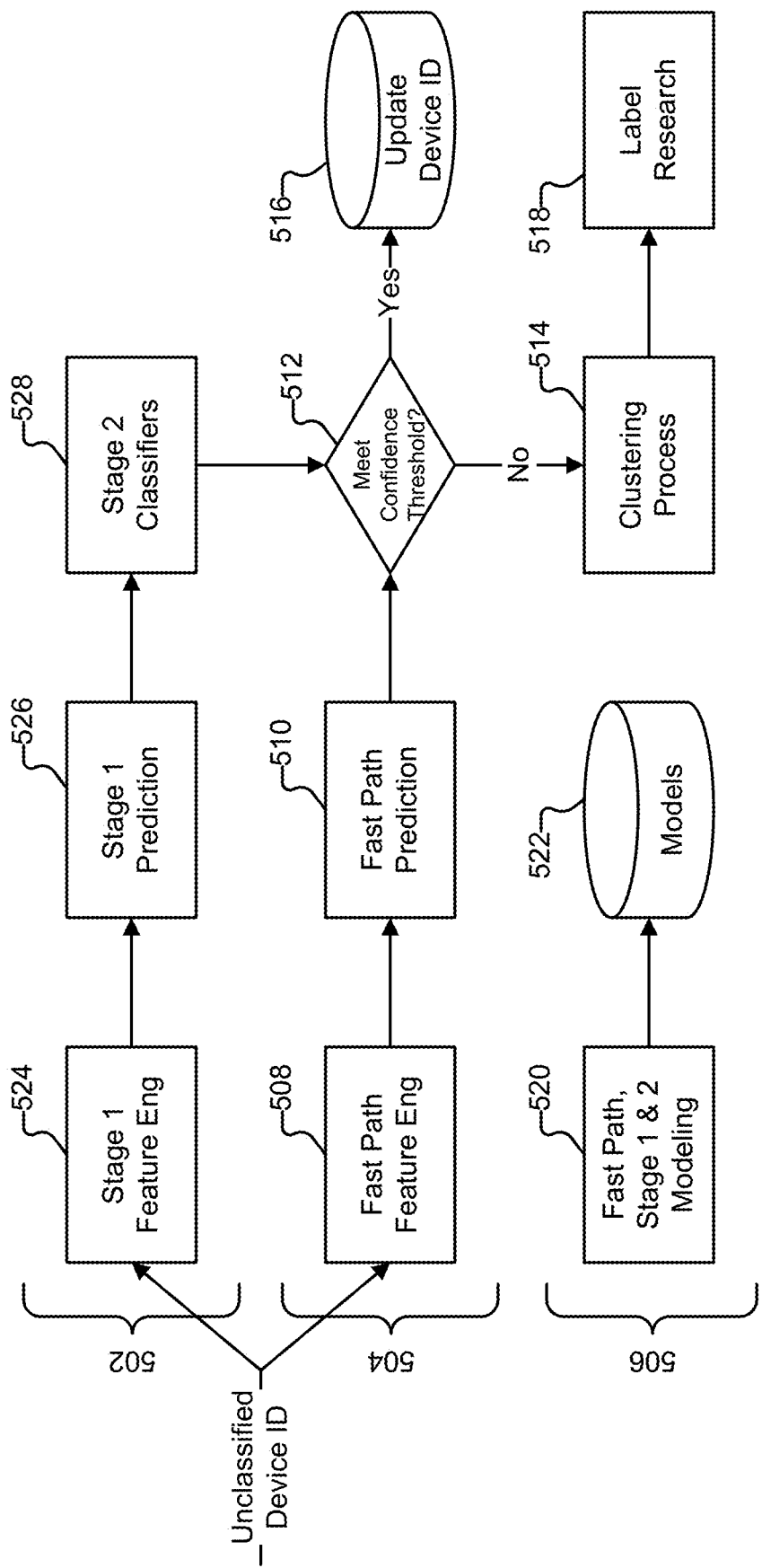
FIG. 5 illustrates an embodiment of an IoT module.

An embodiment of module 138 is shown in FIG. 5. One example way of implementing IoT module 138 is using a microservices-based architecture in which services are fine-grained and protocols are lightweight. Services can also be implemented using different programming languages, databases, hardware, and software environments, as applicable, and/or relatively small services that are messaging enabled, bounded by contexts, autonomously developed, independently deployable, decentralized, and built and released with automated processes.

As previously mentioned, in various embodiments, security platform 140 periodically receives information (e.g., from data appliance 102) about IoT devices on a network (e.g., network 110). In some cases, the IoT devices will have previously been classified by security platform 140 (e.g., a CT scanner that was installed on network 110 last year). In other cases, the IoT devices will be newly seen by security platform 140 (e.g., the first time whiteboard 146 is installed). Suppose a given device has not previously been classified by security platform 140 (e.g., no entry for the device is present in database 286 which stores a set of unique device identifiers and associated device information). As illustrated in FIG. 5, information about the new device can be provided to two different processing pipelines for classification. Pipeline 504 represents a "fast path" classification pipeline (corresponding to a pattern ID-based scheme) and pipeline 502 represents a "slow path" classification pipeline (corresponding to a machine learning-based scheme).

In pipeline 504, a fast path feature engineering is performed (508) to identify applicable static and sequence features of the device. A fast path prediction is performed (510) using pattern IDs or previously built models (e.g., models based on top important features and built using offline processing pipeline 506). A confidence score for the device matching a particular pattern is determined (512). If the confidence score for a device meets a pre-trained threshold (e.g., based on the overall prediction accuracy of module 138 or components thereof, such as 0.9), a classification can be assigned to the device (in device database 516) or updated as applicable. Initially, the confidence score will be based on the near-realtime fast path processing. An advantage of this approach is that data appliance 102 can begin applying policies to the device's traffic very quickly (e.g., within a few minutes of module 138 identifying the device as new/unclassified). Appliance 102 can be configured to fail-safe (e.g., reduce/restrict the device's ability to access various network resources) or fail-danger (e.g., allow the device broad access) pending a classification verdict from system 140. As additional information becomes available (e.g., via the slow path processing), the confidence score can be based on that additional information, as applicable (e.g., increasing the confidence score or revising/correcting mistakes made during fast path classification).

Examples of features (e.g., static attributes and sequence features) that can be used include the following. Pattern IDs can be any combination of these attributes with logical conditions included:

OUI in mac address
Hostname string from decoded protocols
User agent string from HTTP, and other clear text protocols
System name string from decoded SNMP responses
OS, hostname, domain, and username from decoded LDAP protocols
URLs from decoded DNS protocols
SMB versions, commands, errors from decoded SMB protocols TCP flags
Option strings from decoded DHCP protocols
Strings from decoded IoT protocols such as Digital Imaging and Communications in Medicine (DICOM)
List of inbound applications from local network
List of inbound applications from Internet
List of outbound applications to local network
List of outbound applications to Internet
List of inbound server ports from local network
List of inbound server ports from Internet
List of outbound server ports to local network
List of outbound server ports to Internet
List of inbound IPs from local network
List of inbound URLs from Internet
List of outbound IPs to local network
List of outbound URLs to Internet In some cases, the confidence score determined at 512 may be very low. One reason this can occur is because the device is a new type (e.g., a new type of IoT toy or other type of product not previously analyzed by security platform 140) and there is no corresponding pattern ID available for the device on security platform 140. In such a scenario, information about the device and classification results can be provided to offline processing pipeline 506 which, e.g., can perform clustering (514) on the behaviors exhibited by the device and other applicable information (e.g., to determine that the device is a wireless device, acts like a printer, uses DICOM protocol, etc.). Clustering information can be applied as labels and flagged for additional research 518 as applicable, with any subsequently seen similar devices automatically grouped together. If, as a result of research, additional information about a given device is determined (e.g., it is identified as corresponding to a new type of consumer-oriented IoT meat thermometer), the device (and all other devices having similar properties) can be relabeled accordingly (e.g., as a brand XYZ meat thermometer) and an associated pattern ID generated and be made usable by pipelines 502/504 as applicable (e.g., after models are rebuilt). In various embodiments, offline modeling 520 is a process that runs daily to train and update various models 522 used for IoT device identification. In various embodiments, models are refreshed daily to cover new labeled devices, and are rebuilt weekly to reflect behavior changes (for slow path pipeline 502) and accommodate new features and data insights added during the week. Note that when adding new types of devices to security platform 140 (i.e., creating new device patterns), it is possible that multiple existing device patterns will be impacted, requiring that either the list of features or their importance scores be updated. The process can be performed automatically (and is a major advantage compared to a rule-based solution).

For fast path modeling, neural network-based models (e.g., FNN) and general machine learning models (e.g., XGB) are used extensively for multivariate classification models. Binary models are also built for selected profiles to help improve results and provide input to clustering. A binary model gives yes/no answers to an identity of a device, or certain behaviors of a device. For example, a binary model can be used to determine whether a device is a type of IP phone or unlikely to be an IP phone. A multivariate model will have many outputs normalized to a probability of 1. Each output corresponds to a type of device. Even though binary models are generally faster, it would require that a device goes through many of them in prediction to be able to find the right "yes" answer. A multivariate model can achieve that in one step.

Slow path pipeline 502 is similar to pipeline 504 in that features are extracted (524). However, the features used by pipeline 502 will typically take a period of time to build. As one example, a feature of "number of bytes sent per day" will require a day to collect. As another example, certain usage patterns may take a period of time to occur/be observed (e.g., where a CT scanner is used hourly to perform scans (a first behavior), backs up data daily (a second behavior), and checks a manufacturer's website for updates weekly (a third behavior). Slow path pipeline 502 invokes a multivariate classifier (526) in an attempt to classify a new device instance on a full set of features. The features used are not limited to static or sequence features, but include volume and time series based features as well. This is generally referred as a stage one prediction. For certain profiles when the stage one prediction result is not optimal (with a lower confidence), a stage two prediction is used in an attempt to improve the result. Slow path pipeline 502 invokes a set of decision tree classifiers (528) supported by additional imported device context to classify a new device instance. The additional device context is imported from external source. As an example, a URL the device has connected to may have been given a category and a risk based reputation which can be included as a feature. As another example, an application used by the device may have been given a category and a risk-based score which can be included as a feature. By combining result from stage one prediction 526 and stage two prediction 528, a final verdict of the slow path classification can be reached with a derived confidence score.

There are generally two stages included in slow path pipeline 502. In the slow path pipeline, in some embodiments, stage one models are built with multivariate classifiers, based on neural network techniques. Stage two of the slow path pipeline is generally a set of decision-based models with additional logic to handle probability-related exceptions of stage one. In prediction, the stage two will consolidate input from stage one, applying rules and context to verify stage one output and generate a final output of the slow path. The final output will include an identity of the device, an overall confidence score, the pattern ID that can be used for future fast path pipeline 504, and an explanation list. The confidence score is based on the reliability and accuracy of the model (models also have confidence scores), and the probability as part of the classification. The explanation list will include a list of features that contribute to the result. As mentioned above, investigation can be triggered if the result deviates from known pattern IDs.

In some embodiments, for slow path modeling, two types of models are built, one for individual identity, and one for a group identity. It is often harder to tell the difference between, for example, two printers from different vendors or with different models than it is to differentiate a printer from a thermometer (e.g., because printers tend to exhibit network behavior, speak similar protocols, etc.). In various embodiments, various printers from various vendors are included into a group, and a "printer" model is trained for group classification. This group classification result may provide a better accuracy than a specific model for a specific printer and can be used to update the confidence score of a device, or provide reference and verification to the individual profile identity-based classification, as applicable.

Figure 6:
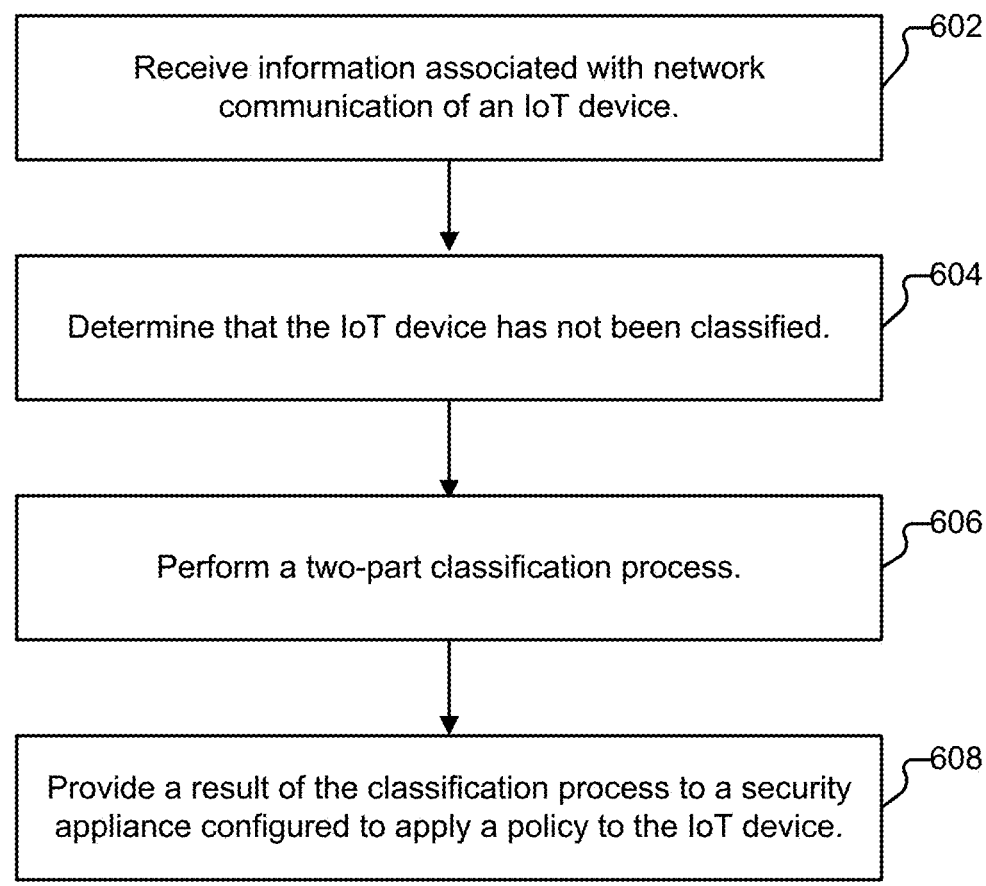
FIG. 6 illustrates an example of a process for classifying an IoT device.

FIG. 6 illustrates an example of a process for classifying an IoT device. In various embodiments, process 600 is performed by security platform 140. Process 600 can also be performed by other systems as applicable (e.g., a system collocated on-premise with IoT devices). Process 600 begins at 602 when information associated with a network communication of an IoT device is received. As one example, such information is received by security platform 140 when data appliance 102 transmits to it a device discovery event for a given IoT device. At 604, a determination is made that the device has not been classified (or, as applicable, that a re-classification should be performed). As one example, platform 140 can query database 286 to determine whether or not the device has been classified. At 606, a two-part classification is performed. As an example, a two-part classification is performed at 606 by platform 140 providing information about the device to both fast path classification pipeline 504 and slow path classification pipeline 502. Finally, at 608, a result of the classification process performed at 606, along with the summarized network behavior from baseline modeling (290) is provided to a security appliance configured to apply a policy to the IoT device. Examples of such summarized network behavior include the most used applications, URLs, and other attributes that can help form a security appliance policy that can be "extracted" from machine-learning trained baseline models for IoT device profiles. As mentioned above, this allows for highly fine-grained security policies to be implemented in potentially mission critical environments with minimal administrative effort.

In a first example of performing process 600, suppose that an Xbox One game console has been connected to network 110. During classification, a determination can be made that the device has the following dominant features: a "vendor=Microsoft" feature with 100% confidence, a "communicates with Microsoft cloud server" feature with 89.7% confidence, and matches a "game console" feature with 78.5% confidence. These three features/confidence scores can collectively be matched against a set of profile IDs (a process done by a neural network-based prediction) to identify the device as being an Xbox One game console (i.e., a profile ID match is found that meets a threshold at 512). In a second example, suppose that an AudioCodes IP phone has been connected to network 110. During classification, a determination can be made that the device matches a "vendor=AudioCodes" feature with 100% confidence, an "is an IP audio device" feature with 98.5% confidence, and "acts like a local server" feature with 66.5%. These three features/confidence scores are also matched against the set of profile IDs, but in this scenario suppose that no existing profile ID is matched with sufficient confidence. Information about the device can then be provided to clustering process 514 and, as applicable, a new profile ID can ultimately be generated and associated with the device (and used to classify future devices).

As applicable, security platform 140 can recommend particular policies based on the determined classification. The following are examples of policies that can be enforced:
  deny Internet traffic for all Infusion Pumps (irrespective of vendor)
  deny Internet traffic for all GE ECG Machines except from/to certain GE hosts
  only allow internal traffic to Picture Archiving and Communication System (PACS) servers for all CT Scanners (irrespective of vendor)

VI. IoT Device Application Workload Capture

Some types of security threats can be detected and/or prevented in realtime based on the observance of a single packet or event. As one example, data appliance 102 can detect/block an attempted transmission of a known malicious file (e.g., as an attempted file download made by client device 104 from a malicious website or as sent to client device 104 as an attachment) by comparing a signature of the file to a list of known-bad files. Other types of security threats require a larger set of data (e.g., a packet capture) to identify.

Network traffic analysis can be performed in realtime (e.g., by data appliance 102 as traffic flows through it), and can also be performed offline (e.g., by security platform 140 analyzing previously stored traffic) in conjunction with post-incident forensics, research, etc. Unfortunately, while the availability of some computing resources continues to grow rapidly (e.g., cloud-based storage and cloud-based computation capabilities), other resources (e.g., the storage and computation capabilities of data appliance 102) are limited. As one example, an embodiment of data appliance 102 may process thousands of network transactions per second, which translates to tens of thousands of individual packets or more (potentially terabytes of packets per day). Storing and processing this amount of data in realtime could be challenging/infeasible based, e.g., on the data appliance 102's hardware specifications. Further, even if storing and processing every packet were possible, it would likely be very expensive (e.g., the cost of purchasing cloud storage and associated computing resources) and/or otherwise have negative impact (e.g., reduced network speeds/performance experienced by end users due to computational overhead placed on data appliance 102). Accordingly, there exists an ongoing need to be able to prioritize which network traffic is captured, to best support complex tasks such as realtime traffic analysis and post-incident forensics analysis, while at the same time also scaling with the amount of network traffic handled by, and resources of, data appliances such as data appliance 102.

Figure 7:
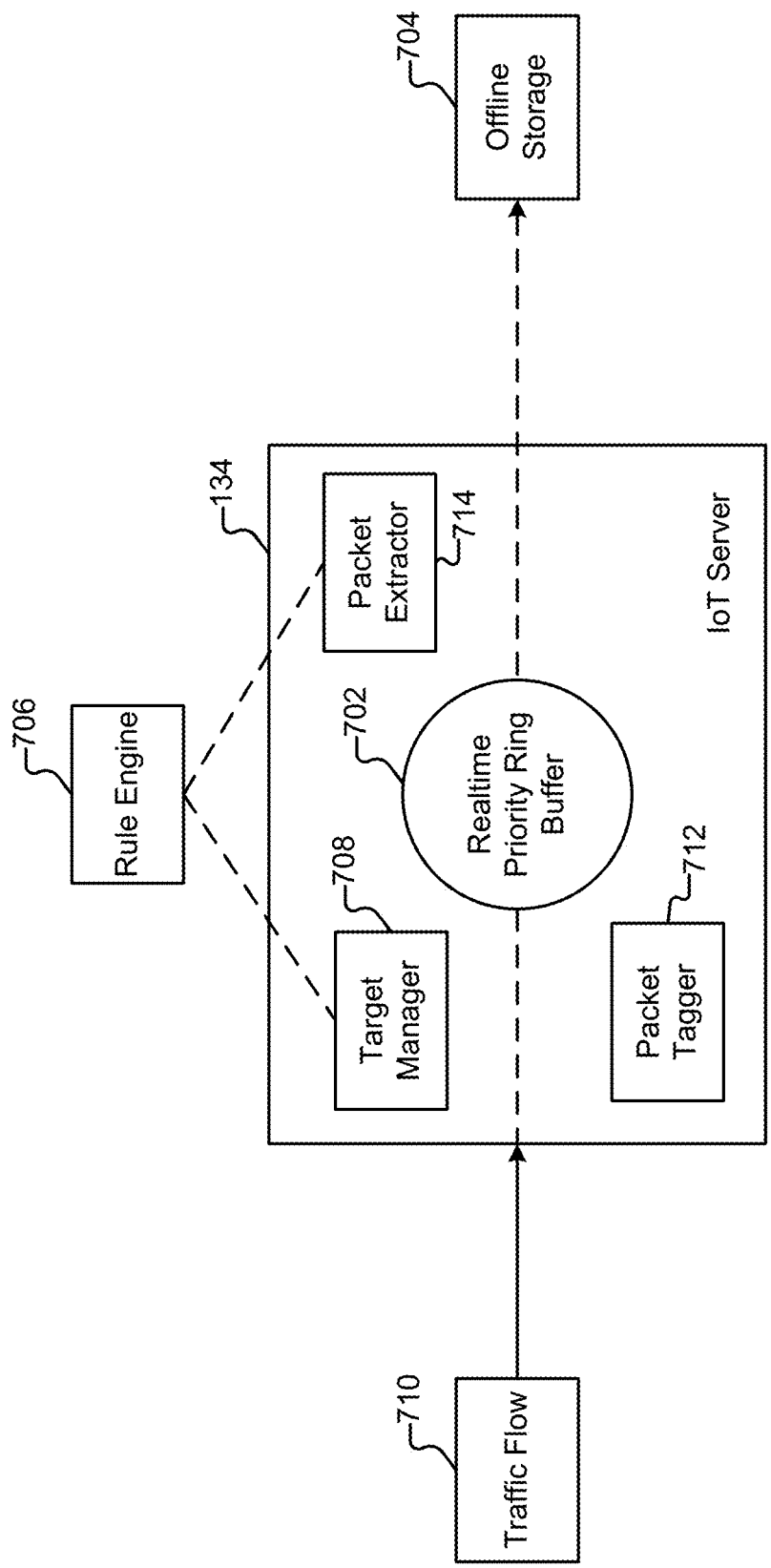
FIG. 7 illustrates an embodiment of an IoT server.

FIG. 7 illustrates an embodiment of an IoT server. As previously explained, an IoT server can take a variety of forms, including as a standalone server (or set of servers), whether physical or virtualized, and can also be collocated with/incorporated into data appliance 102 as applicable (e.g., as IoT server 134). Included in IoT server 134 is a realtime priority ring buffer 702 (which can also be referred to as a circular buffer, circular queue, or cyclic buffer). Buffer 702 stores raw IoT network session data. In an example implementation of buffer 702, the total buffer size is 500 MB of RAM with additional space optionally reserved for snapshots. The size of the buffer can vary. However, a constraint on buffer size is that sorting through a larger buffer may not be worth the effort because IoT network data in a ring buffer typically has low information density. In an example implementation, ring buffer 702 is divided into 50 batches with a size of 10 MB each. A given batch includes traffic data (e.g., raw traffic data) for a span of time and, upon reaching the batch size limit of 10 MB, a new batch is filled with traffic data. In an alternate example, a time-based ID for each batch is used, and batches are indexed by time. Ring buffer 702 need not have its elements shuffled around when one is consumed, can have a fixed maximum size, can have constant time queue operations, and overwrites old data with new data in a manner reminiscent of a first-in-first-out (FIFO) queue in that the first data written is the first data overwritten.

As incoming packets arrive (710), they can be made available by the kernel for capture (e.g., via the Berkeley Packet Filter (BPF)). IoT server 134 performs a variety of tasks in conjunction with ring buffer 702. The first task is selectively placing a subset of packets that it receives (e.g., from the BPF) into ring buffer 702. A second task is selectively extracting a flow of packets out of ring buffer 702 (e.g., sending to offline storage 704 in response to activation of a trigger). IoT server 134 opportunistically preserves traffic corresponding to the most interesting flows and (e.g., if an alert triggers) can provide packets (e.g., as contextual information) for permanent storage and subsequent analysis.

A. Target Acquisition

Rule engine 706 is configured to provide IoT server 134 with instructions for determining when IoT server 134 should admit packets into ring buffer 702 (e.g., under what circumstances IoT traffic should be captured and with respect to which IoT devices). In an example embodiment, rule engine 706 is included in IoT module 138 (e.g., as one or more Spark applications 295) and helps IoT server 134 identify capture targets. Target manager 708 (e.g., implemented as a set of one or more scripts) uses information provided by rule engine 706 (and, as applicable, data appliance 102's own observations of devices and network traffic) to maintain a list of targets for traffic capture. As will be described in more detail below, traffic capture can be performed on all network traffic associated with a given target IoT device, and can also be selectively narrowed (e.g., to traffic associated with one or more specific kinds of traffic, such as to/from a particular IP address and/or port, using a particular protocol, and/or related to a particular application associated with the target device).

One example consideration in determining whether IoT traffic should be captured is a risk level associated with the IoT device. An example risk level is a score on a 0-100 point scale as follows:

- 0-39 the device poses a normal/low risk
- 40-69 the device poses a medium risk (e.g., bad user practices have been observed such as using a manufacturer default password)
- 70-89 the device poses a high risk (e.g., exploits have been attempted by or against it, or the device has attempted to access a risky Internet site)
- 90-100 the device poses a critical risk (e.g., a known breach of the device has occurred)

In various embodiments, the risk level is determined by IoT module 138 (e.g., based on various information analyzed and stored by IoT module 138 as described above) and can be used to select IoT traffic for capturing in a variety of ways. In a first example, a rule can be set to target for capture traffic of all IoT devices within network 110 with a risk score of 80 or higher. If a given device routinely and consistently has a score at/below 60, its traffic is not captured (unless other applicable conditions are met). However, if an observation is made that the device's risk has elevated to 80 points (e.g., the device is observed taking certain risky actions, the device's vendor has published a vulnerability warning, or the device's firmware is out of date), the device can be added to a target list and capturing of at least a portion of its traffic is started. In an alternate example, a rule can be set to target for capture the traffic of IoT devices whose security scores raise by a threshold amount (e.g., a gain of 50 or more points), irrespective of whether or not a particular score is reached. As an example, if a device typically has a risk score of 20 but subsequently has a risk score of 70 (e.g., based on the observance of particular risky activities), it can be added to the target list.

Another example consideration in determining whether IoT traffic should be captured is a detected configuration change/behavioral change to the IoT device (e.g., where the IoT device begins using an existing application in a different way or begins using a new application). As applicable, the capture can be limited in scope to just that traffic associated with the changed application.

Some specific example scenarios for performing selective IoT device traffic capture are as follows:

- An IV pump has its risk score raised (e.g., from 50 to 80) by IoT module 138 due to the publication of an applicable new Common Vulnerabilities and Exposures (CVE) entry and observation of anomalous connections not matching the pump's typical behavior.
- A set of security cameras are relocated from a first subnet to a different subnet that allows inbound connections from networks not previously observed. This configuration change (along with an existing CVE related to the cameras) makes it a target for capture.
- An X-ray machine has a routine heartbeat connection from its installed security agent to a security server every hour. The X-ray machine begins missing the heartbeat. This observed change makes it a target for capture.
- A Microsoft Remote Desktop Protocol (RDP) vulnerability is discovered and published by Microsoft. All IoT devices that make use of the RDP protocol will have elevated risk scores, potentially making them eligible as targets for capture.

Using the RDP vulnerability as an example, a rule for targeting traffic capture can be specified as follows:

if risk_score changes and risk_score>medium and application==RDP then tag=on and hours=24

This rule specifies that if a device's risk score changes to high or critical, and the application it is using is RDP, the associated packets (also referred to herein as the "RDP workload") should be captured for 24 hours. Other examples of rules that can be used to limit packet capture include rules specifying that, for a given IoT device on the target list, only traffic to/from a particular IP address (or exchanged via a particular website) or traffic occurring in a particular time window (e.g., Mondays from 8am-8:30 am) be captured.

Each application executing on a device has a corresponding flow that can be observed by a data appliance (e.g., a TCP flow or UDP flow observed by data appliance 102). As previously discussed, while all packets associated with a given IoT device could be captured, overall load on packet capture can be reduced by only capturing packets associated with a particular flow. At the transport layer, a flow can be uniquely identified by a 5-tuple: <src_ip, src_port, dst_ip, dst_port, prot>, where src_ip is the source IP address, src_port is the source port number, dst_ip is the destination IP address, dst_port is the destination port number, and prot is the protocol number. A hash table can be used to map each unique 5-tuple to an integer flow identifier. When a packet arrives, the 5-tuple in its transport layer header is used to look up the hash table to find the flow identifier if it exists, or create a new one otherwise. One way that IoT server 134 can very specifically focus on particular flows is through tagging them (and their packets) with packet tagger 712 (implementable, e.g., as a set of scripts). When a first packet in a flow is received (in the TCP case, for example, a TCP SYN packet is sent by a client to a server), if the packet matches an applicable targeting rule, packet tagger 712 tags the flow (e.g., adds the 5-tuple to a tagging list). When subsequent packets are received, if their 5-tuple appears on the tagging list, they can be admitted into ring buffer 702 accordingly.

In the examples above, and conversely, a target could be removed when the risk score returns to normal, or when other conditions (which could be set by the same rule) are met (e.g., a defined number of sessions have been captured, or a period of time has passed).

B. Packet Extraction

As packets continue to arrive, ring buffer 702 will eventually start automatically overwriting older packets in its storage with newer ones (i.e., data remains on a ring buffer for a relatively short period of time). If a particular attack or other security-related matter occurs over a longer period of time, it may evade detection (e.g., a network traffic analysis that requires four days' worth of traffic may not succeed if only two hours of traffic are available). In addition to selectively admitting packets into ring buffer, 702, another task performed by IoT server 134 is selectively extracting packets out of ring buffer 702 for longer term storage. Those extracted packets can be saved locally and then optionally transmitted to offline storage 704 (e.g., stored within network 110 and/or stored by security platform 140 for aggregation and subsequent analysis).

In various embodiments, packet extractor 714 (implementable, e.g., as a set of scripts) extracts packets from ring buffer 702 and saves them (e.g., to a local storage which can then be copied externally as applicable). Extraction can be performed in a variety of ways. As one example, packet extractor 714 can use a set of smart triggers to determine which packets to extract. A first example of a smart trigger is a time-based trigger (e.g., once an hour, or every day at 15:00). A second example of a smart trigger is an alert-based trigger (e.g., IoT module 138 generates an alert and provides it to IoT server 134 which extracts the packets implicated by the alert). An example of an alert-based trigger is as follows. Suppose it is known that a particular IV pump is vulnerable to a particular exploit described in a CVE (and packets associated with the IV pump were being captured in ring buffer 702). Further suppose that an active exploit targeting the IV pump is observed (e.g., by appliance 102 or by security platform 140). An alert can be generated accordingly (e.g., by security platform 140) and ultimately (either directly or indirectly) routed to IoT server 134 which then triggers extraction of packets associated with the IV pump from ring buffer 702 for offline storage (and, as applicable, analysis). Such alerts can similarly be used to initiate the capture of packets as applicable (e.g., where IoT server 134 is not already admitting packets associated with the IV pump to ring buffer 702).

Triggers can be configured based on a variety of factors. Examples of such factors include whether or not a device is designated as "mission critical" (e.g., making a trigger either more sensitive or turning the trigger into an auto-trigger for continuous workload capture), anomalous behavior (triggering workload extraction when a device deviates from its expected behavior), timeliness (files can be indexed by flow time and workload can be extracted using a timestamp), new patterns (devices with no prior behavior model have traffic with a start time but with a pattern that is not yet known, which, if configured to do so, can trigger continuous workload capture until the pattern is learned and categorized as not requiring workload capture), and threats (greater threats, including devices with high risk scores, can make a trigger more sensitive or turn the trigger into an auto-trigger for continuous workload capture).

Figure 8:
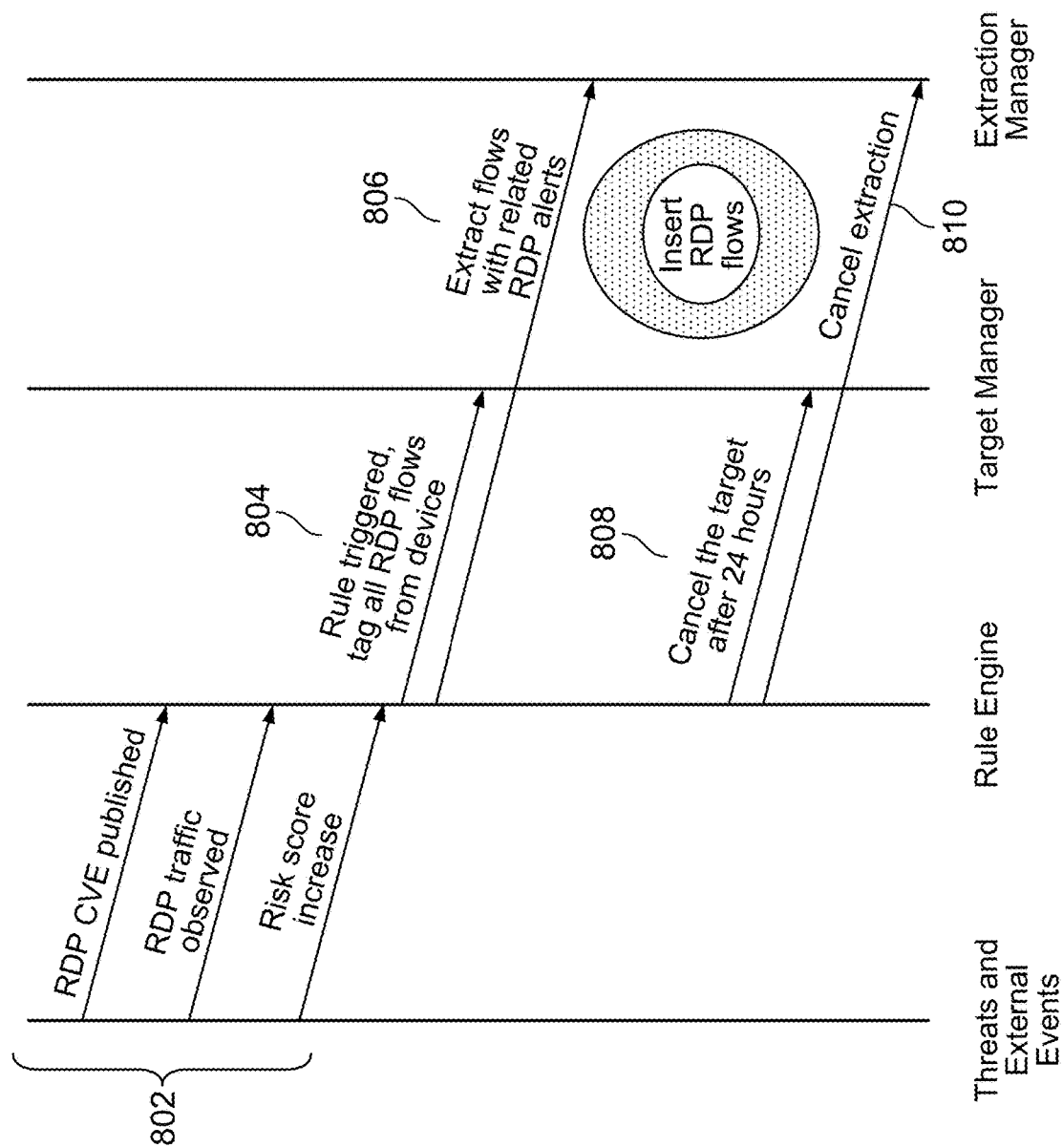
FIG. 8 illustrates examples of messages that can be exchanged in conjunction with capturing IoT device application workload.

FIG. 8 illustrates examples of messages that can be exchanged in conjunction with capturing IoT device application workload. The exchange of messages depicted in FIG. 8 corresponds to the RDP vulnerability scenario described above. Events that occur in the scenario include that: an RDP CVE is published, RDP traffic is observed, and a device's risk score increases (802). Those events collectively cause rule engine 706 to instruct target manager 708 to begin capturing packets associated with the device's use of RDP into ring buffer 702 (804) and also to instruct packet extractor 714 the conditions under which packets should be extracted from ring buffer 702 (806). After one day passes, rule engine 706 instructs target manager 708 to remove the device from its target list (i.e., stop capturing its packets) (808) and similarly instructs extraction manager 810 to stop extracting associated packets out of ring buffer 702 (810). Any packets associated with the device that remain (unextracted) in ring buffer 702 will eventually be overwritten with other packets.

Figure 9:
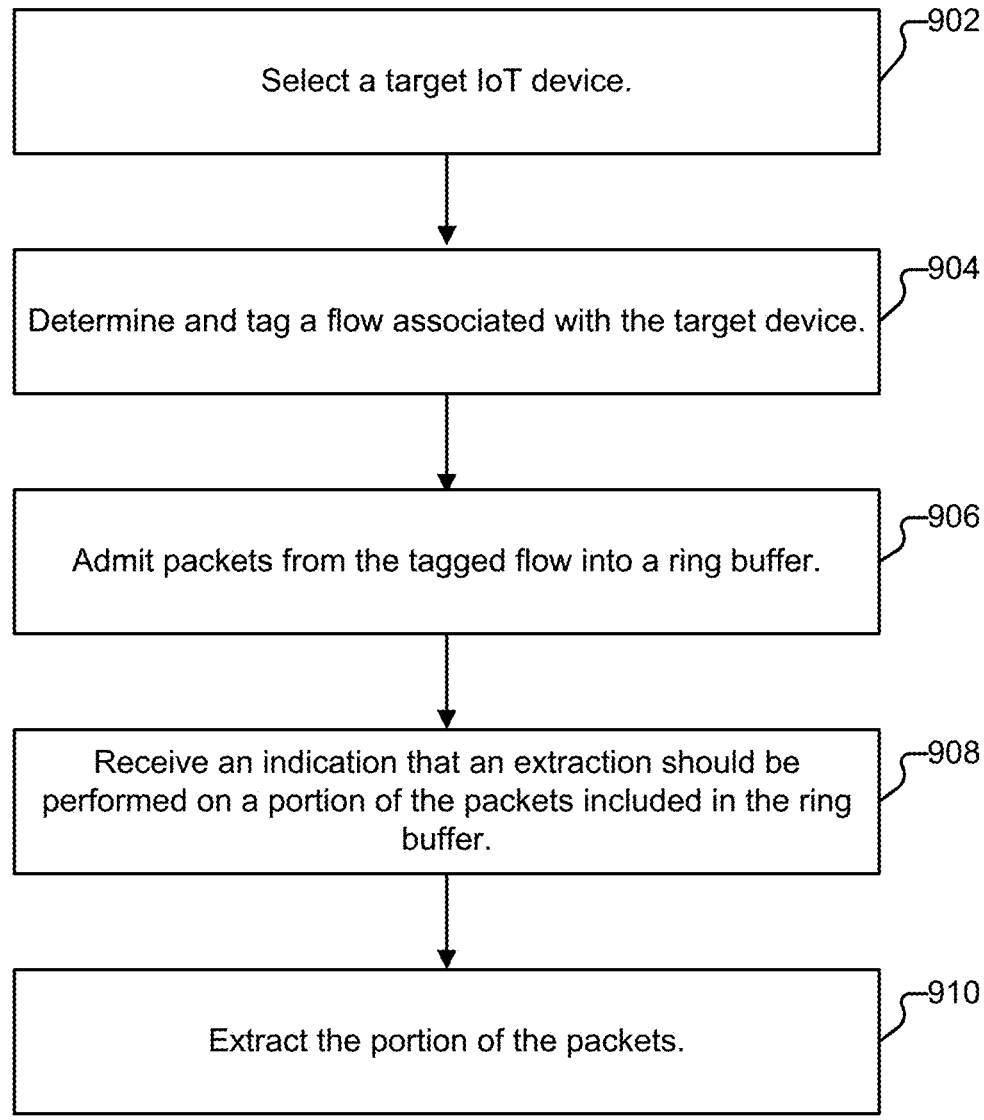
FIG. 9 illustrates an example of a process for capturing IoT device application workload.

FIG. 9 illustrates an example of a process for capturing IoT device application workload. In various embodiments, process 900 is performed by IoT server 134. Process 900 begins at 902 when a target IoT device is selected. An example of such a selection occurs when rule engine 706 (e.g., as provided by IoT module 138) instructs IoT server 134 to add a given IoT device to a target list. At 904, a flow associated with the device is determined and tagged. The tag is used (e.g., at 906) to admit packets (i.e., packets associated with the tagged flow) into a ring buffer (e.g., ring buffer 702). At 908, an indication is received that an extraction should be performed on a portion of packets included in the ring buffer. An example of such an indication is the triggering of a smart trigger. Finally, at 910, packets are extracted from the ring buffer. Generally, all packets belonging to a tagged flow will be extracted. As mentioned above, the extracted packets can be stored temporarily to a local storage (if applicable) and can be stored offline. One advantage of this approach is that a packet capture, potentially spanning a lengthy period of time (e.g., days or weeks), can be efficiently built for offline analysis.

VII. IoT Security Event Correlation

A. Introduction

As mentioned above, some types of security threats can be detected via a signature or pattern match on a single file or packet. Unfortunately, other types of threats can involve multiple events (including sequences of events) and can evade such single signature-based detection. To detect more advanced attacks (including a variety of IoT-related attacks), in various embodiments, security platform 140 correlates multiple events (including, potentially, from multiple packets and multiple sessions or flows at different times) together for analysis.

One example of an advanced attack is a port scan or IP scan intentionally performed slowly to evade detection (e.g., ultimately scanning 10,000 targets over multiple days). Each scan is a new session. Any one session of this slow attack will likely appear benign (e.g., to security platform 140 or data appliance 102). However, if, for example, 200 sessions over a five minute period are analyzed, it could be determined that a particular device has started sessions with a set of 100 IP addresses on the same subnet, and when a ten or fifteen minute period is considered, it could be determined that the device has sequentially scanned a set of ports to systematically locate open ports and services, and an alert could be generated (or another remedial action such as instructing data appliance 102 to block communications with the device) accordingly.

Another example of an advanced attack is a distributed denial of service (DDoS) attack launched against a web server that takes resources away from the web server by starting, but not closing, connections. As the unclosed connections accumulate (potentially over days), the web server will run out of resources and stop responding to new requests. As with the previous example, any one observation of an unclosed connection will likely appear benign. However, if multiple of the unclosed connections are collectively analyzed, the attack could be detected.

More sophisticated attacks (e.g., advanced persistent threats (APTs) and ransomware attacks) can be described using a sequence of stages (also referred to as a "cyber kill chain"). Examples of such stages include initial scanning/reconnaissance to identify a suitable target, exploiting a vulnerable device (e.g., after dropping malicious code onto the device), exfiltration of data (e.g., to a command and control server), and optionally covering up evidence of the compromise. Detecting/analyzing such multi-stage attacks also requires observation/correlation of multiple events.

As used herein, a "security event" includes a variety of events (e.g., observable by data appliance 102 and/or security platform 140) that are of interest in a security context (e.g., potentially usable to protect a device from a security perspective). One example of a security event is a threat signature matching event (e.g., where data appliance 102 matches a specific payload in a single packet). That threat signature matching event can be used as an input signal. That is, instead of/in addition to generating an alert based on the observance of that single signature matching event, the fact the signature match has occurred can be used as input to a larger threat detection scheme. Another example type of security event includes one pertaining to the activities of an application, such as authentication/login activities, file upload/download activities, authorization requests, submission of user-entered form content, etc. Yet another example type of security event includes device network behavior, such as an IoT device making home calls to a server (e.g., to check for software updates or report status information, etc.). Another example type of security event includes detection of an anomaly on a device (e.g., a threshold deviation from known default behavior of the device).

As used herein, an "identifiable pattern of correlation" (IPC) refers to a common feature (or set of common features) that can be used to correlate multiple security events together. Examples of IPCs are as follows:
  IP addresses, URLs, applications, and/or port numbers
  time intervals or sequences of events
  login users
  CVEs and/or threat families If, for example, two flows or two sessions are associated with the same application, the application is the IPC shared between the two sessions/flows. Similarly, if two flows or two sessions have a shared IP address, the IP address is an IPC shared between the two sessions/flows. In another example, suppose event A is followed by event B, which is followed by event C. If multiple instances of that sequence of events are found, the sequence can be used as an IPC to link events. Similarly, if the same user is logged in to an IoT device during different events, the user can be used as an IPC to link the events. And, if a CVE or threat family (e.g., malware family) is implicated in multiple events, those CVEs/families/etc. can be used as an IPC. IPCs can be generated using static rules, statistical approaches, and/or artificial intelligence/machine learning based classification to determine features that can be correlated with identifiable incidents for conversion to IPCs.

In various embodiments, security platform 140 stores (e.g., in storage 158) a set of security event graphs that correspond to various threat scenarios. As used herein, a "correlation strength indicator" (CSI) score is an assigned score between two security events that are correlated with one another. A CSI score is a weight of an edge between two IPCs connected in a security event graph. Two security events sharing a particular CSI may have different CSI scores depending on device type or other factors. The CSI score is calculated based on models trained with devices' network traffic behaviors. In various embodiments, the models are trained offline for various attack scenarios (e.g., by data scientists). As one example, a recent vulnerability will need a new model to detect. An attack using the vulnerability can be simulated and network events captured, then added to the model database. New correlation graphs and rules will be added as well. As applicable, weekly/monthly refreshes can be done of any of the models, as more samples become available. The trained models can be stored in a model database, along with other models such as a set of classifiers for baseline behaviors trained for device personality, models for general anomalies, and specific attacks. As one example, a baseline model describes that a common behavior of an IoT device using the Microsoft Windows operating system (e.g., a CT scanner) will also allow SMB protocol handshakes. The Windows Operating System and SMB protocol usage will have a higher correlation score. In another example, a specific threat model determines that an SMB anonymous login is often seen followed by an SMB scan. The two activities will have a stronger correlation. The probability of the two activities happening is approximately 95% in the model. The CSI score is determined based on the probability. As used herein, a "separate event distance" (SED) is calculated by accumulating CSI scores along the paths between two events in the security event graph. Both CSIs and SEDs are calculated, in various embodiments, by an event correlator.

B. Event Correlator

Figure 10:
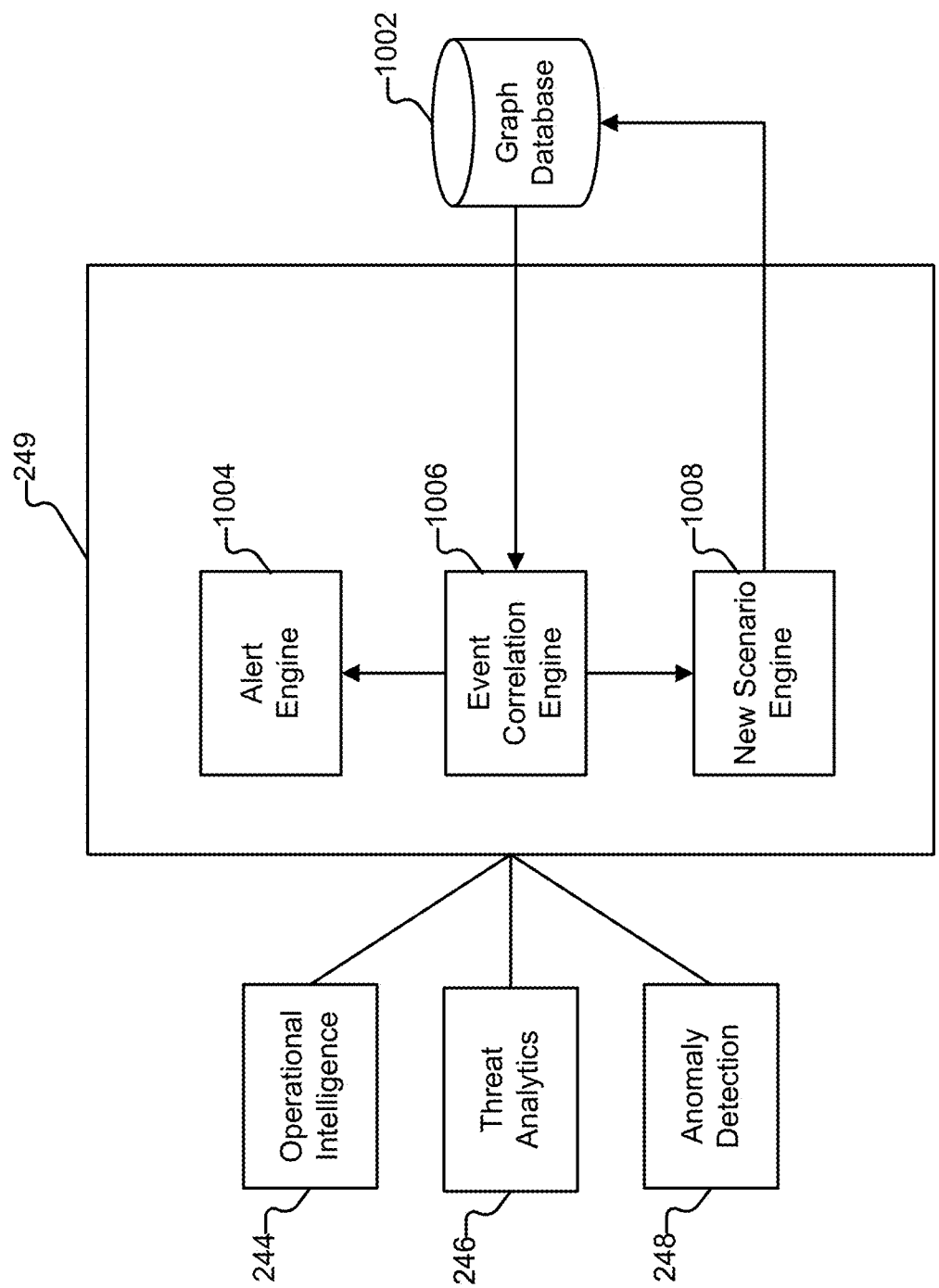
FIG. 10 illustrates an embodiment of an event correlator.

FIG. 10 illustrates an embodiment of an event correlator. The example shown depicts event correlator 249, which is included in IoT module 138 of security platform 140. An example implementation of event correlator 249 is as a Spark application. Event correlator 249 takes as input various security events from various sources. As illustrated in FIG. 10, such sources include operational intelligence module 244 (e.g., providing device network behavior events), threat analytics module 246 (e.g., providing threat signature matching events determined from a thread log provided by data appliance 102), and anomaly detection module 248 (e.g., providing anomalous IoT device behavior events). Other types of input can also be provided, instead of or in addition to those depicted in FIG. 10 (e.g., CVE information). Event correlator 249 is triggered by incoming security events. As security events arrive into event correlator 249, event correlation engine 1006 attempts to match sets of those events (as connected to one another by IPCs) against security event graphs (corresponding to various predefined threat scenarios) stored in graph database 1002 (and/or a REDIS cache as applicable). The incoming security events are stored in a cache (e.g., a REDIS cache).

Security event graphs and scenarios are referred to interchangeably herein. An example of a scenario is the WannaCry ransomware cryptoworm attack, which targeted computers running vulnerable versions of the Microsoft Windows operating system in a series of phases. Elements of the attack (simplified) included searching for organizations with open TCP port 445 (SMB) endpoints exploitable with EternalBlue, injecting code into the SMB system processes of located endpoints, searching for internal vulnerable endpoints and compromising them, making connections to a command and control server, and finally encrypting the endpoints and demanding a ransom.

In various embodiments, which graphs are selected by the event correlation engine for comparing against sets of received security events is determined based on the type of the received security events. FIG. 11 illustrates an example of a set of correlation rules (1100) which, if match conditions are met by a set of received security events, indicates that the predetermined "wannacry-event-correlation" graph (1102) is matched (i.e., the received security events indicate that a WannaCry attack has occurred). Portion 1104 of ruleset 1100 indicates that the security events to be correlated need to either be internal alerts (e.g., from events previously observed by security platform 140 but which did not exceed a threshold required to be reported to an end user by alerting module 256) or anomalies (received from anomaly detection module 248). Other types of received events are excluded from correlation. Further, the received security events must be of a "threat" type, instead of, for example, an "operational" type to match the correlation ruleset. Region 1106 of ruleset 1100 provides information about how the correlation should be performed. The "scope" in this example is "device," meaning that any considered security events need to be related to a single device. The "period" in this example is "1 day," meaning only security events occurring within the same one day period will be considered. The "filter" portion of region 1106 lists the subset of internal alerts or anomalies (1104) (only) that will be considered. A "dark IP scan" is an anomaly event that indicates many IP scans were blindly sent to a continuous IP space, e.g., 0.1 through 0.254 (indicating that the attacker doesn't know which IP addresses are visible or real, and which do not exist). An "excessive outbound connections Internet anomaly" is a signal that means the device is making many more outbound connections than occurs in typical behavior. An "IP scan" is an anomaly event that indicates many specific/target IP scans were made (as opposed to a dark IP scan). The "excessive anonymous login outbound high" anomaly event indicates that the device is making an anonymous login to a host as a client. The "outbound SMB anomaly" indicates that the device is attempting to make outbound connections using the SMB protocol in an uncommon manner. The "EternalBlue code exploit" signal indicates that an internal alert was generated that is associated with the EternalBlue family. "The WannaCry code drop" signal is an internal alert that a code drop from an attacker to a victim's machine using SMB as an executable code download was observed. The "DoublePulsar exploit" signal indicates that an attacker is exploiting a vulnerability called DoublePulsar, a backdoor that is opened on the victim machine. The final signal, "WannaCry C2 connection" indicates that the device is making connections to particular known command and control hosts. Of note, not all of the items appearing in region 1106 need to be observed in order for event correlation engine 1006 to determine that a device has been subjected to a WannaCry attack. Further, even seemingly probative signals (e.g., "WannaCry code drop") if observed in isolation may nonetheless be false positives (e.g., where a researcher has copied files that appear to be a code drop but no attack is taking place). Portion 1008 indicates activation conditions applicable to the items appearing in the filter portion (1106) of ruleset 1110 (providing IPC definitions). The "anomaly" level indicates how anomalous individual signals must be. In this example, observations must be 10× outside of the typical observation. Thus, if typically 20 Internet connections are observed in a one day period, 200 or more would need to be observed to satisfy the anomaly level. The "sequence" indicates the order in which the filtered security events must be observed, where each of the trailing words in the filtered security events (e.g., -scan or -exploit) has a corresponding entry in the sequence. Portion 1110 indicates what action should be taken if the filtered security events sufficiently match the predetermined WannaCry graph. In the example of FIG. 11, a "publish alert" will be generated—one that will be sent to a user, as contrasted with an internal alert (and can be pushed by alert engine 1004 to alerts 256). Another type of action that could be taken would be a "block," e.g., instructing data appliance 102 to terminate all network access for the device. In various embodiments, the actions are customizable (e.g., by an administrator of data appliance 102). Of note, the alerts generated using this approach are high value alerts, indicating with high confidence that attacks are occurring (rather than, for example, inundating an administrator with many individual alerts of anomalies, etc.). Finally, "rate limit" specifies that if multiple alerts are triggered regarding events matching the scenario, a limit on the number of alerts actually sent should be limited.

Scenarios, such as the WannaCry scenario, are built and accumulated by new scenario engine 1008. Whenever new types of scenarios are identified (e.g., a new type of attack is discovered in the wild), graphs can be created and pushed into graph database 1002 by new scenario engine 1008. One approach to building new scenarios is as follows. As new security events arrive into event correlator 249, event correlation engine 1006 accesses past events (e.g., the past one day of events for a given device) in REDIS and attempts to match the set of events (including the newly arrived event) against any applicable graphs. Based on the graph and CSI threshold, other related events that have happened (or subsequently happen) are obtained. In various embodiments, the detection CSI threshold is set at 80 for all users. Users can modify the detection CSI threshold (e.g., set it lower) in post detection analysis to surface additional relevant events that did not meet the detection threshold. If no match is found, the new event is stored in REDIS (alongside the previously received events). As additional matching events are received, the total similarity score for the graph is updated to determine whether the set of related events has sufficiently matched the graph. If a threshold amount of time is reached (e.g., two days), all of the events received by event correlator 249 pertaining to the device are sent to new scenario engine 1008, which analyzes the events that it receives to determine whether a new graph should be constructed. New scenario engine 1008 (e.g., executing as a script) constructs a graph (comprising nodes for the events and edges for IPCs) using the received events and determines CSI scores. New scenario engine 1008 is configured to collect a sufficient number of samples to train models, and use the top important features to determine a CSI based on the feature contribution and co-exist probability. In various embodiments, the constructed graphs are vetted (e.g., by a researcher) prior to being included in graph database 1002.

Example Graph Evaluations

Figure 12A:
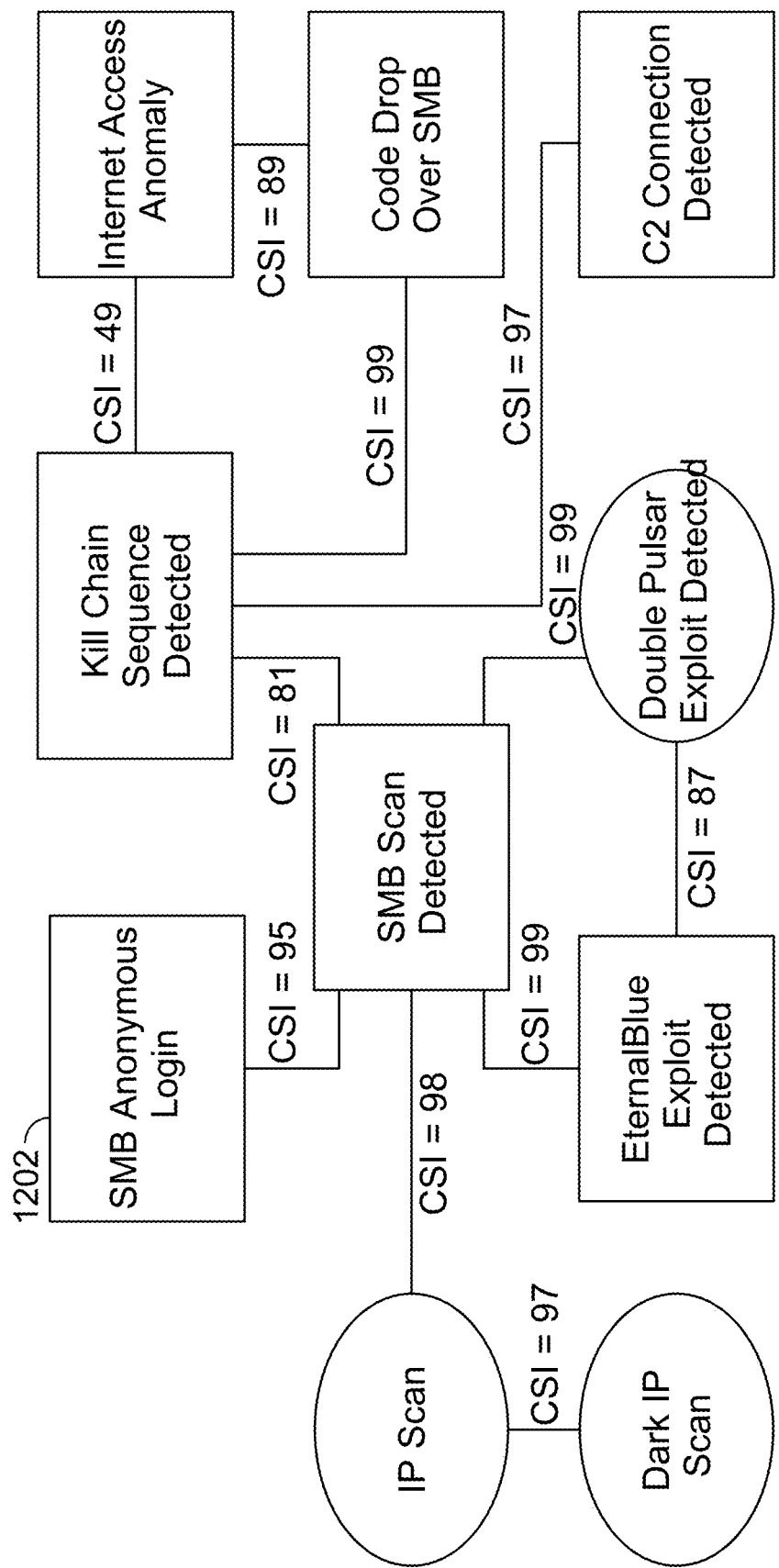
FIG. 12A is a representation of a set of security events positively matching a WannaCry graph.

FIG. 12A is a representation of a set of security events positively matching a WannaCry graph. The graph is selected from graph database 1002 using a threshold. Each event has a weight for the scenario. As one example, the "kill chain sequence detected" event may carry greater weight than "IP scan." As illustrated in FIG. 12A, square nodes (e.g., node 1202) indicate security events that are found to have happened using a CSI threshold of 80. As previously mentioned, CSI scores connect two events together and measure how relevant they are to each other. In one example, suppose a model is trained for WannaCry classification. Such a model is an example of a model that can be trained (e.g., by data scientists) using network events collected in an actual or simulated WannaCry attack (e.g., a pcap usable to generate all of the events with a timeline). The kill chain sequence and IP scan both show up as top important features, along with the SMB scan. The probability of a kill chain sequence coupled with the SMB scan showing up is lower than the probability of the pair of the kill chain sequence and IP scan (e.g., 98). Therefore, the CSI score between the SMB scan and kill chain is lower (e.g., 81) within the WannaCry scenario.

A total similarity score (a weighted sum) is calculated to measure against the threshold to determine whether the received security events match the scenario. In this example, the total similarity score is 97, which becomes the certainty score when an alert is generated. Each event in the graph is assigned a weight that reflects the probability that the event will be observed. If the event is observed, the weight is accumulated. If CSI is used to pull in all relevant events, the weighted sum is calculated and compared to a pre-set threshold (e.g., 80 or 70) to determine if the events are a positive match to the scenario. A CSI is between two events. If the two events are not next to each other (i.e., with a direct connection) a "derived" CSI is calculated by multiplying the CSI scores on the edges and will generally be lower. For example, a CSI between an IP scan and an SMB scan is 98. A CSI between an SMB scan and a kill chain is 81, so a CSI from an IP scan to kill chain would be 79 (98%*81%).

Figure 12B:
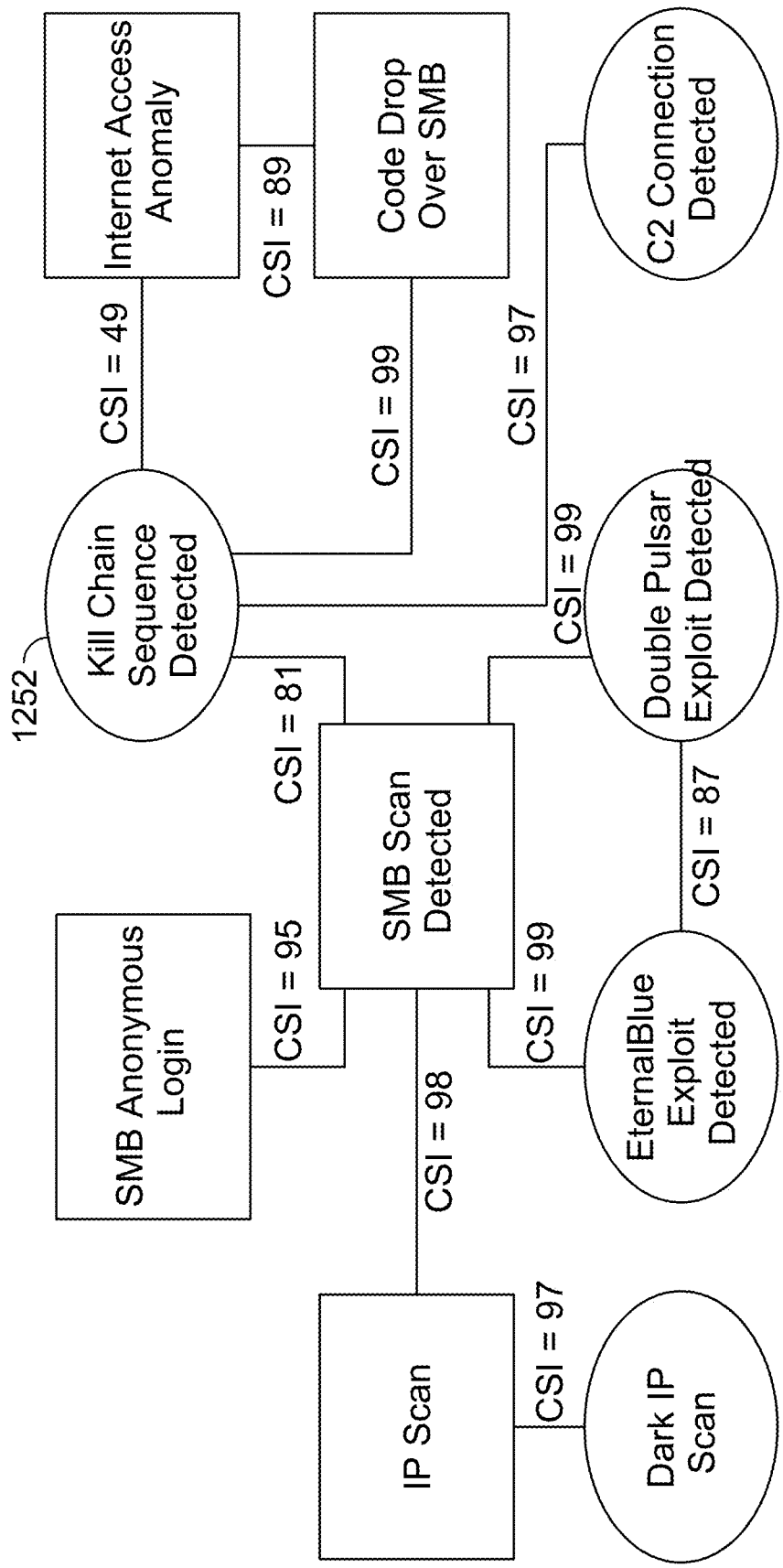
FIG. 12B is a representation of a set of security events that do not match the WannaCry graph.

FIG. 12B is a representation of a set of security events that do not match the WannaCry graph. In this example, the total normalized similarity score is 47 (where all weighted sums are normalized back to a 100 point range), lower than the required threshold of 80. As the received security events do not (yet) meet the matching criteria for the WannaCry graph, no detection/alert is made. In the example illustrated in FIG. 12B normal use of the SMB protocol is illustrated. If, however, within an applicable time scope, additional security events are received (e.g., security event 1252), the updated total similarity score will be incremented and if it exceeds the required threshold, an alert can be generated/other remedial actions can be taken (e.g., instructing the security appliance to block or restrict communications, increase a logging level, etc.).

Example Process

Figure 13:
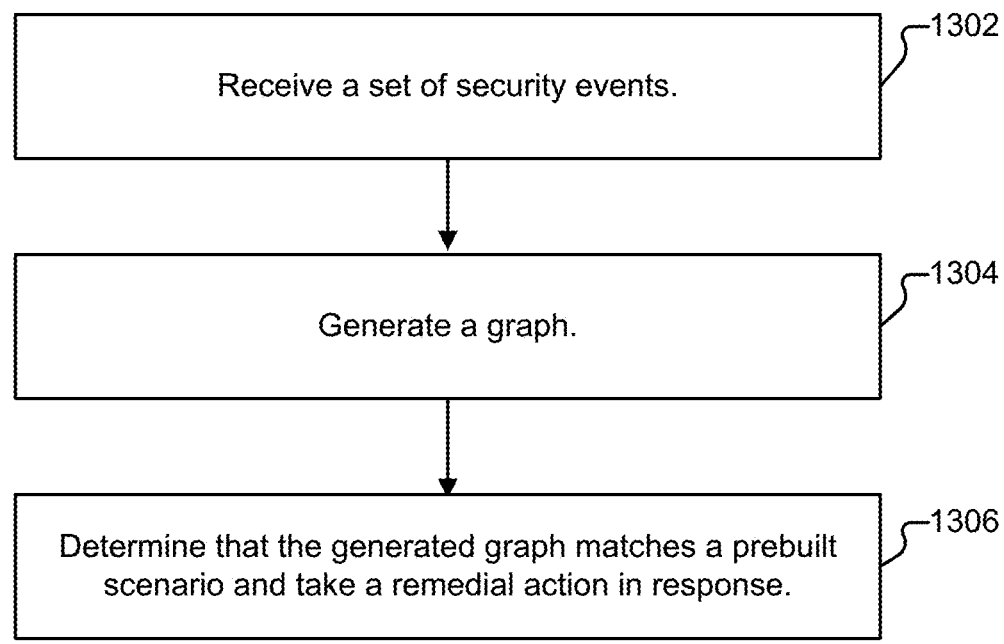
FIG. 13 illustrates an embodiment of a process for correlating IoT security events.

FIG. 13 illustrates an embodiment of a process for correlating IoT security events. The process can be performed in real-time, to efficiently detect sophisticated, multi-part attacks as they occur, allowing for rapid remediation. In various embodiments, process 1300 is performed by security platform 140. Process 1300 can also be performed by other systems as applicable (e.g., a system collocated on-premise with IoT devices). Process 1300 begins at 1302 when a set of security events is received. As explained above, in one example, various security events are received (e.g., from threat analytics module 246 and anomaly detection module 248). At 1304, a graph is generated. Also as explained above, the nodes in the graph correspond to security events, and the edges in the graph correspond to IOCs. Finally, at 1306, a determination is made as to whether or not the generated graph matches a prebuilt scenario, and if it does, a remedial action is taken in response. An example of such a match being found is illustrated in FIG. 12A. As explained above, a variety of actions can be taken in response to the detection made at 1306. As one example, an alert can be surfaced to an administrator. As another example, a data appliance such as data appliance 102 can be instructed to take an action with respect to one or more devices (e.g., blocking or restricting access to resources). Further, an alert or other output generated at 1306 can be provided to other components of security platform 140 for further processing, as applicable. As one example, detection of a WannaCry attack on one node can be combined with other detected attacks on other devices to determine, e.g., whether a campaign of attacks is occurring, so that additional remedial actions can be taken (e.g., notifying a first enterprise customer that a second enterprise customer with similar devices was recently attacked so that actions can be taken to prevent the first enterprise customer from being similarly attacked). Further, while event correlation techniques are generally described above in the context of detecting/alerting on real-time attacks, correlation information determined by event correlator 249 can also be used in post event analysis by finding all related signals to help users respond to the incident. When detecting an incident, the correlation information can help filter out noise and capture the most significant events. When serving post detection response, the correlation can help present a full picture of the incident by automatically identifying related events (i.e., those other events in the set collectively matched with a given scenario graph).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor, configured to perform the following based at least in part on instructions provided by a memory:
        receive a set of security events associated, collectively, with a plurality of sessions;
        use at least some of the received security events in the set to generate a graph, wherein nodes in the graph correspond to the at least some of the received security events in the set, and wherein edges in the graph correspond to identifiable patterns of correlation (IPCs); and
        determine that the generated graph exceeds a threshold for matching a prebuilt scenario, including by determining a correlation strength indicator (CSI) score between two nodes, wherein the CSI is determined based on a probability of two events occurring in the prebuilt scenario, and take a remedial action in response, wherein taking the remedial action includes identifying one or more events of significance to the matching, and providing them as output; and
    the memory, wherein the memory is coupled to the processor and configured to provide the processor with instructions.

2. The system of claim 1, wherein at least one security event included in the set is a threat signature matching event.

3. The system of claim 1, wherein at least one security event included in the set is an application activity.

4. The system of claim 1, wherein at least one security event included in the set is a device network behavior.

5. The system of claim 1, wherein at least one security event included in the set is an anomaly detection output.

6. The system of claim 1, wherein at least one IPC is one of: an IP address, a URL, an application, or a port number.

7. The system of claim 1, wherein at least one IPC is a time interval.

8. The system of claim 1, wherein at least one IPC is a sequence of events.

9. The system of claim 1, wherein at least one IPC is a logged in user.

10. The system of claim 1, wherein at least one IPC is an external context.

11. The system of claim 1, wherein determining that the generated graph exceeds the threshold for matching the prebuilt scenario includes accumulating CSIs along paths between two events.

12. A method, comprising:
  receiving a set of security events associated, collectively, with a plurality of sessions;
  using at least some of the received security events in the set to generate a graph, wherein nodes in the graph correspond to the at least some of the received security events in the set, and wherein edges in the graph correspond to identifiable patterns of correlation (IPCs); and
  determining that the generated graph exceeds a threshold for matching a prebuilt scenario, including by determining a correlation strength indicator (CSI) score between two nodes, wherein the CSI is determined based on a probability of two events occurring in the prebuilt scenario, and taking a remedial action in response, wherein taking the remedial action includes identifying one or more events of significance to the matching, and providing them as output.

13. The method of claim 12, wherein at least one security event included in the set is a threat signature matching event.

14. The method of claim 12, wherein at least one security event included in the set is an application activity.

15. The method of claim 12, wherein at least one security event included in the set is a device network behavior.

16. The method of claim 12, wherein at least one security event included in the set is an anomaly detection output.

17. The method of claim 12, wherein at least one IPC is one of: an IP address, a URL, an application, or a port number.

18. The method of claim 12, wherein at least one IPC is a time interval.

19. The method of claim 12, wherein at least one IPC is a sequence of events.

20. The method of claim 12, wherein at least one IPC is a logged in user.

21. The method of claim 12, wherein at least one IPC is an external context.

22. The method of claim 12, wherein determining that the generated graph exceeds the threshold for matching the prebuilt scenario includes accumulating CSIs along paths between two events.

23. A computer program product embodied in a non-transitory computer readable medium and comprising computer instructions for:
  receiving a set of security events associated, collectively, with a plurality of sessions;
  using at least some of the received security events in the set to generate a graph, wherein nodes in the graph correspond to the at least some of the received security events in the set, and wherein edges in the graph correspond to identifiable patterns of correlation (IPCs); and
  determining that the generated graph exceeds a threshold for matching a prebuilt scenario, including by determining a correlation strength indicator (CSI) score between two nodes, wherein the CSI is determined based on a probability of two events occurring in the prebuilt scenario, and taking a remedial action in response, wherein taking the remedial action includes identifying one or more events of significance to the matching, and providing them as output.

* * * * *